(12) United States Patent
Matsunaga et al.

(10) Patent No.: US 6,541,185 B1
(45) Date of Patent: Apr. 1, 2003

(54) MICROPATTERN POLARIZED ELEMENT

(75) Inventors: Daisaku Matsunaga, Tokyo (JP);
Kunihiro Ichimura, Kanagawa (JP);
Takashi Tamaki, Ibaraki (JP)

(73) Assignees: Japan Chemical Innovation Institute, Tokyo (JP); Agency of Industrial Science and Technology, Tokyo (JP)

( * ) Notice: Subject to any disclaimer, the term of this patent is extended or adjusted under 35 U.S.C. 154(b) by 366 days.

(21) Appl. No.: 09/665,824

(22) Filed: Sep. 20, 2000

(51) Int. Cl.[7] .................................................. G02B 5/30
(52) U.S. Cl. ........................... 430/321; 349/15; 349/97; 428/1.31
(58) Field of Search ........................... 430/321; 349/15, 349/97; 428/1.31

(56) References Cited

U.S. PATENT DOCUMENTS

| 5,024,850 A | * | 6/1991 | Broer et al. .................... 428/1 |
| 5,327,285 A | | 7/1994 | Faris ............................ 359/483 |
| 5,667,719 A | * | 9/1997 | Mortazavi et al. ..... 252/299.01 |
| 5,751,389 A | | 5/1998 | Andreatta et al. ............. 349/97 |
| 5,844,717 A | | 12/1998 | Faris ............................ 359/483 |

FOREIGN PATENT DOCUMENTS

| JP | 62-96905 | | 5/1987 |
| JP | 7-261024 | | 10/1995 |
| JP | 10-160932 | | 6/1998 |
| JP | 10-160933 | | 6/1998 |
| JP | 11-160538 A | * | 6/1999 |

OTHER PUBLICATIONS

Mol. Cryst.Liq.Cryst., 1997, vol. 298, pp. 221–226: Kunihiro Ichimura, et al.; "Polarization Photchromism of Polymer Thin Films and its Applications".

* cited by examiner

*Primary Examiner*—John A. McPherson
(74) *Attorney, Agent, or Firm*—Nields & Lemack

(57) ABSTRACT

A polarized element formed by arranging a dichroic molecule in a micropattern form on a thin film layer of a liquid crystalline resin having a photoactive group irradiated by a linearly polarized light. The micropattern polarized element can be produced without need of a very high position-matching precision as sticking.

12 Claims, 4 Drawing Sheets

Wavelength(nm)

MICROPATTERN POLARIZED ELEMENT

FIELD OF THE INVENTION

Figure 1:
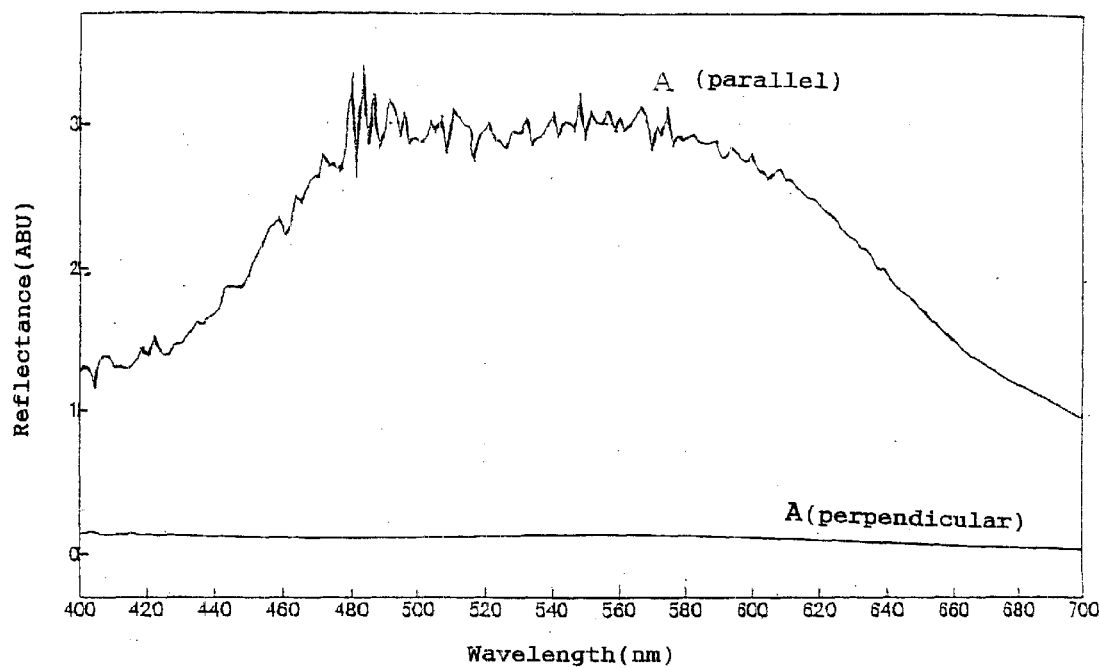

The present invention relates to a novel micropattern polarized element of a high polarizability and the production method thereof, and further to a liquid crystal display device capable of stereoscopic vision using micropattern polarized elements each having a different polarized light axis.

BACKGROUND OF THE INVENTION

Hitherto, various polarized elements wherein plural polarized regions each having a different polarized light transmitting direction are formed as patterns are known.

For example, Japanese Patent Laid-Open No. 96905/1987 proposed a method of, after coating a resist on a stretched polyvinyl alcohol film, applying a pattern exposure and development to pattern the resist, and dyeing the portions of the stretched polyvinyl alcohol film not covered by the resist with a dichroic compound to form a polarized region of a desired pattern.

Sadeg M. Faris reports, in Society of Information and Display Conference, a method of, after coating a resist in pattern on a stretched dichroic polyvinyl alcohol film, dissolving off with aqueous sodium hydroxide solution to form a patterned polarized film, and preparing a polarized element called μPol by laminating two such patterned polarized films of which the polarizing axes are crossed at right angle to use for stereoscopic vision (SID 91 DIGEST, pages 840–843).

Japanese Patent Laid-Open No. 261024/1995 proposes a method of irradiating a thin film of a photo-orienting substance coated on a substrate with polarized light in a pattern form and forming thereon a solution of a dichroic dye followed by orienting to form a polarized region of a desired pattern.

Japanese Patent Laid-Open No. 73015/1997 provides a micropatterned polarized element formed by covering a substrate with an oriented film of a fluorine resin, and after coating thereon a resin followed by patterning, accumulating thereon a material containing a dichroic dye.

Japanese Patent Laid-Open No. 160932/1998 proposes a polarized element obtained by sticking plural polarized pieces on a substrate such a manner that the polarized light transmitting axes of the adjacent polarized pieces are different from each other.

Japanese Patent Laid-Open No. 160933/1998 proposes a polarized element having plural polarized light transmitting axes obtained by forming an oblong or lattice-form partially polarized member the polarized light transmitting axis of which is directed to one direction by partially scraping the polarized film disposed on a substrate by a dicer, placing thereon a polarized film having the polarization axis in a different direction, and scraping off the polarized film portions on the existing polarized member by a dicer, or a polarized element sticking each other the partially polarized members scraped by the dicer, each having a different polarized light transmitting axis.

On the other hand, in regard to a stereoscopic vision, various methods are proposed and a binocular disparty stereoscopic vision utilizing the polarization is one of the methods. This system is also called a polarized spectacles system and is the system that spectacles using polarized plates the polarized light axes of which cross at right angle each other are put on the right eye and the left eye and the images for the right eye and the left eye having a binocular parallax are observed by dividing the image information for the left and the image information of the right between the left eye and the right eye respectively by the polarized plates of the spectacles of the observer. In the system, projecting images each having a different polarization axis, a method of synthesizing the images formed using two display apparatus or two projecting apparatus by a half mirror or a polarization mirror is employed. In this case, the display apparatus become expensive and the system is suitable in the case of showing stereoscopic images for many observers but has the problem that the system is unsuitable to for office use, a display, etc., for domestic use or for seeing by few peoples.

Thus, it has been proposed that by using micropattern polarized elements the polarized light axes of which cross at right angle in a same plane for a display apparatus, it is possible to simultaneously display the image of a right eye and the image for a left eye in one display apparatus and further the apparatus can be produced at a low cost.

The polarized elements of forming patters of plural polarized regions each having the different polarized light transmission direction, which has hitherto been known, have the following problems.

In the method of Japanese Patent Laid-Open No. 96905/1987, because a stretched PVA film is dyed, not only the polarization performance is lowered as compared with an ordinary method of stretching after drying but also there is a problem that in the case of forming a pattern by developing, the stretched PVA film is swelled to spoil the uniaxial property, and the polarization performance is more lowered, whereby a polarized element having a satisfactory polarizability is not obtained.

In the method (SID SI DIGEST, pages 840–843, U.S. Pat. No. 5,327,285) reported by Sadeg M. Faris in Society of Information and Display Conference, there are-problems that because after coating a resist on a stretched dichroic polyvinyl alcohol film followed by patterning, in the case of dissolving off with an aqueous sodium hydroxide solution, the remaining polarized element portions are swelled, whereby the polarization performance is lowered, and also because the polarized element is produced by sticking two kinds of substrates, the polarization axes cross at right angle, each other, a very high position matching precision is required at sticking.

In the method of Japanese Patent Laid-Open No. 261024/1995, a thin film of a photo-orienting substance coated on a substrate is irradiated with a polarized light in a pattern form and solution of a dichroic dye is coated thereon and oriented, but in regard to the method, Ichimura reported as follows in Mol. Cryst. Liq. Cryst., 1997, Vol. 298, pp. 221–226. That is, when the oriented dye film is observed by an interatomic force microscope (AFM), the portions that the dye is uniformly oriented as shown in FIG. 1($a$) (in the Ichimura's report, and so forth) and the portions (crater) that dye scarcely exist and is not oriented as shown in FIG. 1($b$) are observed. The absorbances of the portion of FIG. 1($a$) and the portion of FIG. 1($b$) are measured by a microscopic spectrophotometer and it has been seen that because of the many craters, the uniformity of the whole dye film is lowered and the polarization performance becomes insufficient. When the present inventors calculated the dichroic ratio (DR) from the portion of FIG. 1($a$) and the portion of FIG. 1($b$), there is a large difference such as DR($a$)≅30 and DR($b$)≅1.3, and in a wide area including them, DR=5 to 6, which is not a level which could be satisfied as a display element. In addition, the calculation of the dichroic ratio (DR) is carried out by the following formula $$DR = A\|/A\perp$$

$A\|$: Absorbance when the polarization axis is parallel to the molecular long axis of the oriented dye.

$A\perp$: Absorbance when the polarization axis is perpendicular to the molecular long axis of the oriented dye.

In the method of Japanese Patent Laid-Open No. 73015/1997, after covering a substrate with the oriented film of a fluorine resin and coating thereon a resist followed by patterning, a material containing a dichroic dye is accumulated to form a micropatterned polarized element but there is a problem that in the case of treating the oriented film of a fluorine resin with a resist, because the orienting property of the fluorine resin oriented film is perhaps reduced by the influence of the resist film remaining as the thin film thereof on the surface or the influence of the development treatment, the orienting property of the material containing the dichroic dye accumulated thereon is not sufficient and also the polarization performance is insufficient.

In the method of Japanese Patent Laid-Open No. 160932/1998, the polarized element is formed by sticking plural polarized pieces to a substrate such that the polarized light transmitting axes of the adjacent polarized pieces differ but there is a problem that in the case of sticking plural polarized pieces, a very high position-matching precision is required.

In the method of Japanese Patent Laid-Open No. 160933/1998, a polarized element having plural polarized light transmitting axes obtained by forming an oblong or lattice-form partially polarized member the polarized light transmitting axis of which is directed to one direction by partially scraping the polarized film disposed on a substrate by a dicer, placing thereon a polarized film having the polarization axis in a different direction, and scraping off the polarized film portions on the existing polarized member by a dicer, or a polarized element sticking each other the partially polarized members scraped by the dicer, each having a different polarized light transmitting axis is formed but there are problems that a very high precision is required in the step of scraping off by a dicer and also in the case of sticking plural partially polarized members each having a different polarized light transmitting axis, a very high position-matching precision is required.

SUMMARY OF THE INVENTION

In view of the above-described circumstances, as the result of various investigations for providing a micropattern polarized element excellent in the partial orientation of a dichroic dye compound without need of a very high position-matching precision as the above-described sticking method of prior art and also for providing a production method of the micropattern polarized element, the inventors have accomplished the present invention.

The present invention relates to a polarized element which is in a practical usable level as a display element by reducing as low as possible the occurrences of the portions of scarcely existing a dye and is not oriented, which becomes the problem in the method of Japanese Patent Laid-Open No. 261024/1995 and wholly increasing the orientation of a dichroic compound.

The present inventors made various investigations about a photoactive molecular layer more suitable to a micropattern-form anisotropic sequence of a dichroic dye molecule and have discovered that a liquid crystalline poly-condensated high molecule such as polyamide, polyimide, polyester, etc.; a liquid crystalline polyaddition reaction high molecule such as polyurethane, etc,; or liquid crystalline polyvinyl cinnamate; each bonded with a photoactive group has excellent characteristics. In the invention, it has astonishingly found that when a liquid crystalline high molecular thin film having a photoactive group is used as an oriented film, the craters as shown in FIG. 1(b) are very less and if any, the size of the craters is far small. Thus, it has been seen that the average dichroic ratio becomes particularly large and the polarized element which can be sufficiently practically used as a display element can be produced.

That is, the present invention is as follows. The 1st aspect of the invention is a polarized element having a liquid crystalline resin thin film layer having a photoactive group on a substrate and a layer containing a dichroic molecule in contact with the liquid crystalline resin thin film layer, wherein the dichroic molecule is arranged in a micropattern form.

The 2nd aspect of the invention is the polarized element of the aspect 1 wherein the photoactive group is a group containing at least one double bond selected from non-aromatic N=N, non-aromatic C=C, and non-aromatic C=N.

The 3rd aspect of the invention is the polarized element of the aspect 1 or 2 wherein the liquid crystalline resin thin film is the thin film of polyamide, polyimide, polyester, or a polyurethane resin.

The 4th aspect of the invention is the polarized element of the aspect 1 or 2 wherein the liquid crystalline resin thin film is a polyvinyl cinnamate resin thin film.

The 5th aspect of the invention is the polarized element of the aspect 1 to 4 wherein the dichroic molecule is a dye having a lyotropic liquid crystalline property.

The 6th aspect of the invention is the polarized element of the aspect 5 wherein the dye having a lyotropic liquid crystalline property is a dye having a hydrophilic substituent.

The 7th aspect of the invention is the polarized element of the aspect 6 wherein the hydrophilic substituent is a sulfonic group, a carboxylic group, an amino group, or a hydroxyl group.

The 8th aspect of the invention is a method of producing a polarized element by forming the thin film of a liquid crystalline resin having a photoactive group on a substrate, and after irradiating the thin film with a linear polarized light, arranging a dichroic molecule on the thin film in a micropattern form.

The 9th aspect of the invention is the method of producing a polarized element of the aspect 8 wherein the irradiation of the linear polarized light is carried out through a micropattern-form mask.

The 10th aspect of the invention is the method of producing a polarized element of the aspect 8 wherein the irradiation of the linear polarized light is carried out using a laser light having a polarizing property.

The 11th aspect of the invention is a method of producing a polarized element by forming the thin film of a liquid crystalline resin having a photoactive group on a substrate, irradiating the thin film with a linear polarized light through a micropattern-form mask, and then after irradiating with a linear polarized light having a different polarized light axis through a different micropattern-form mask, arranging a dichroic molecule on the thin film in a micropattern form.

The 12th aspect of the invention is a stereoscopic display apparatus which is a liquid display apparatus having upper and lower substrates facing each other, wherein at least one of the substrate is a substrate having the polarized element of the aspect 1 to 7.

A liquid crystalline high molecule is a high molecule showing a liquid crystalline property under a certain condition, and as such a liquid crystalline high molecule, there are known a high molecule showing a so-called lyotropic liquid crystalline property in the existence of a solvent and a thermotropic liquid crystalline high molecule showing a liquid crystalline structure in a molten state without the existence of a solvent. In general, the liquid crystalline high molecule has a layer wherein the chain of the molecule is highly oriented in the fluid direction in the liquid crystal state and by fixing the oriented state, a high strength.high elastic material is obtained. Furthermore, many investigations of obtaining an oriented film of a low molecular nematic liquid crystal by utilizing the high orienting property of the liquid crystalline high molecule thin film are made recently.

In the present invention, the object of the liquid crystalline high molecule having the photoactive group is not to obtain a high strength material but is to utilize that the highly orienting property of the high molecular thin film can sufficiently control the orientation of a dichroic molecular layer having the lyotropic liquid crystalline property formed thereon.

BRIEF DESCRIPTIONS OF THE DRAWINGS

Figure 2:
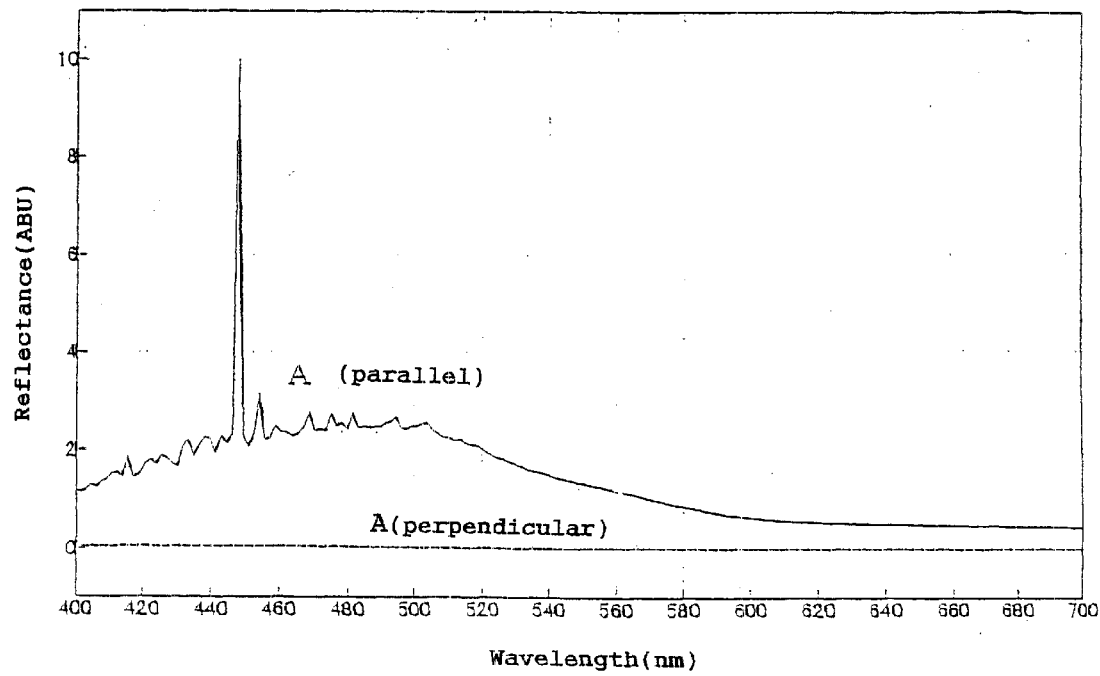
Figure 3:
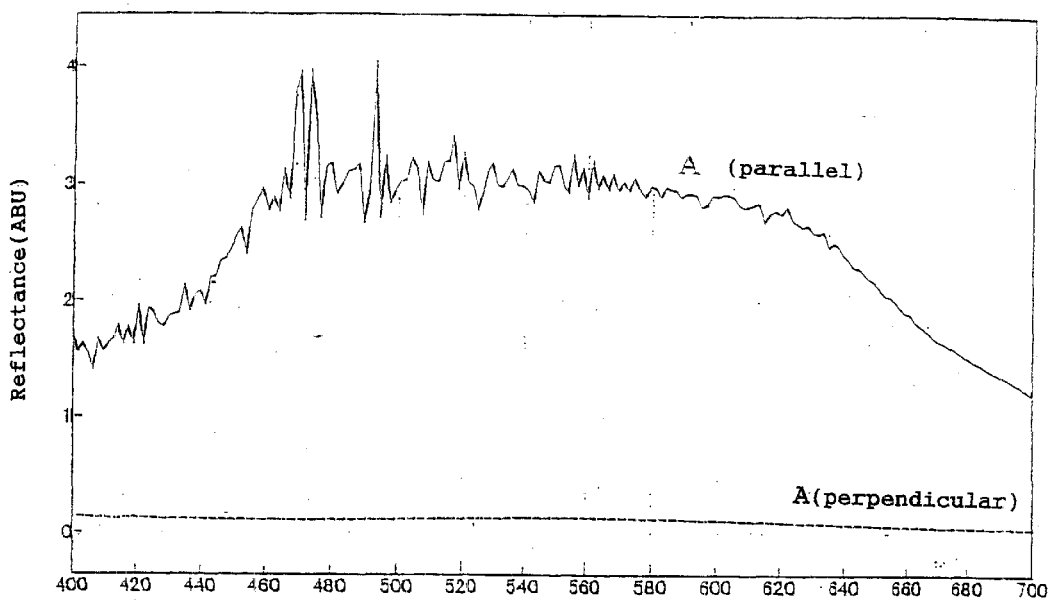
Figure 4:
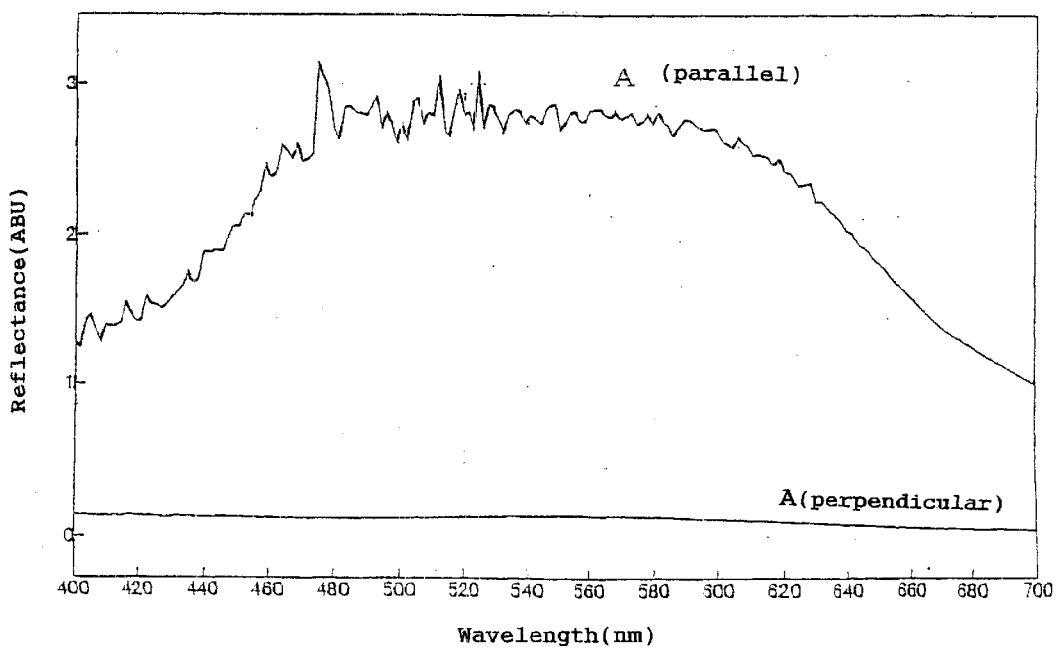
Figure 5:
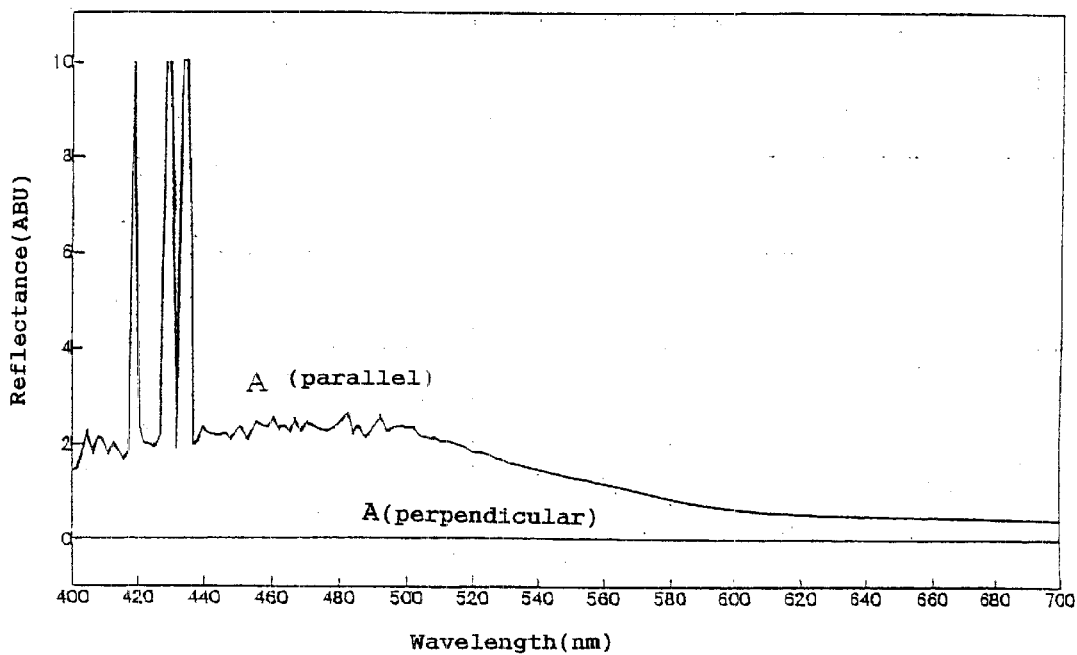
Figure 6:
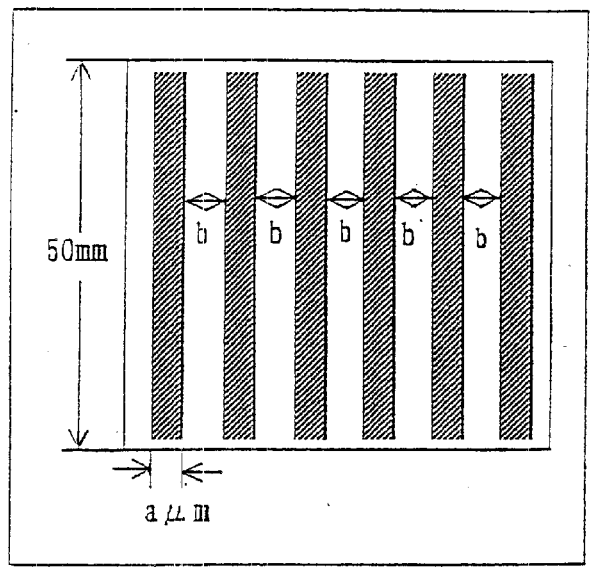
Figure 7:
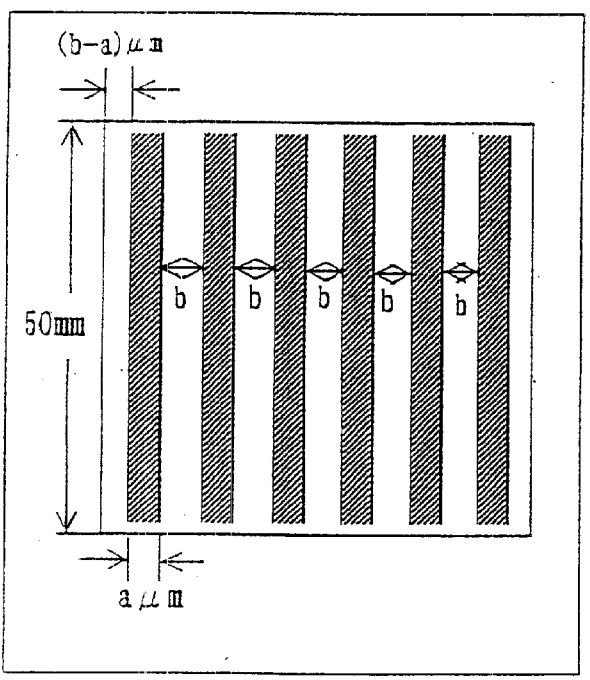

FIG. 1 is a graph showing the visible absorption spectrum of the polarized element obtained in Example 1 [in the figure, A (parallel) shows the absorbance of the case the polarized light axis is parallel to the molecular long axis of the oriented dye, and also A (perpendicular) shows the absorbance of the case the polarized light axis is perpendicular to the molecular long axis of the oriented dye, and so forth in the following figures], FIG. 2 is a graph showing the visible absorption spectrum of the polarized element obtained in Example 2, FIG. 3 is a graph showing the visible absorption spectrum of the polarized element obtained in Example 3, FIG. 4 is a graph showing the visible absorption spectrum of the polarized element obtained in Example 6, FIG. 5 is a graph showing the visible absorption spectrum of the polarized element obtained in Example 7, FIG. 6 is a view showing a test mask wherein light shading portions each having a length of 50 mm and a width of a $\mu$m are arranged with an interval of b $\mu$m, and FIG. 7 is a view showing a test mask wherein light shading portions each having a length of 50 mm and a width of a $\mu$m are arranged with an interval of b $\mu$m, wherein b>a and in the case of overlapping, they are in the position relation that each shading portion of FIG. 7 is disposed between the two adjacent shading portions.

DETAILED DESCRIPTION OF THE INVENTION

Then, the invention is described in detail.

The liquid crystalline polycondensed high molecule such as polyamide, polyimide, polyester, etc., and the liquid crystalline poly addition reaction high molecule such as polyurethane each bonded with a photoactive group, which have been found in the invention, can be obtained as follows. That is, a bifunctional monomer having a photoactive group is prepared and by reacting the monomer and another bifunctional monomer, a desired liquid crystalline high molecular compound can be obtained. Also, liquid crystalline polyvinyl cinnamate is obtained by polymerizing a vinyl cinnamate monomer.

The liquid crystalline high molecular compound bonded with a photoactive group obtained by the polymerization may be a homopolymer obtained by polymerizing a monomer having a photoactive group or a copolymer obtained by reacting a monomer having a photoactive group and a same kind of a monomer without having a photoactive group. By changing the using ratio of the monomer having d photoactive group and a same kind of a monomer without having a photoactive group, the bonded amount of the photoactive group in the high molecular compound can be controlled. The using amount, which depends upon the structure of the monomer, is in the range of from 1:0 to 1:100, and preferably from 1:0 to 1:50.

As practical examples of the liquid crystalline high molecular compound, there are;

1 the polyamide compounds represented by the following formula;

Formula (a)

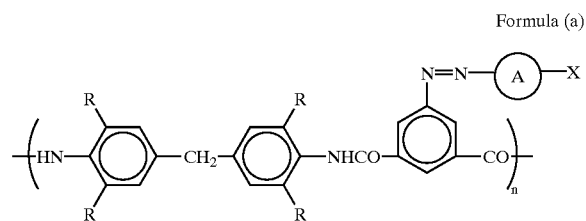

(wherein, R represents an alkyl group having from 1 to 3 carbon atoms such as a methyl group, an ethyl group, an i-propyl group, or a halogen atom such as a chlorine atom; a ring A represents a benzene ring or a naphthalene ring which may have a substituent; X represents an alkoxy group having from 1 to 10 carbon atoms, a dialkylamino group wherein the alkyl has from 1 to 3 carbon atoms, a dihydroxyethylamino group, a hydroxyalkylamino group wherein the alkyl has from 1 to 3 carbon atoms, a dicyanoethylamino group, or a cyanoethylalkylamino group wherein the alkyl has from 1 to 3 carbon atoms; and n represents an integer of from 5 to 10,000) or Formula (b)

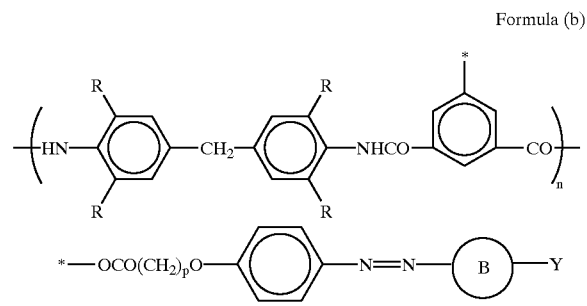

(wherein, R represents an alkyl group having from 1 to 3 carbon atoms such as a methyl group, an ethyl group, an i-propyl group, or a halogen atom such as a chlorine atom; a ring B represents a benzene ring or a naphthalene ring which may have a substituent; Y represents a hydrogen atom, a fluorine atom, a nitro group, a cyano group, an alkyl group having from 1 to 10 carbon atoms, an alkoxy group having from 1 to 10 carbon atoms, or an alkyloxycarbonylvinyl group wherein the alkyl has from 1 to 4 carbon atoms, a dialkylamino group wherein the alkyl has from 1 to 3 carbon atoms, a dihydroxylethylamino group, a hydroxylalkylamino group wherein the alkyl has from 1 to 3 carbon atoms, a dicyanoethylamino group, or a cyanoethylalkylahino group wherein the alkyl has from 1 to 3 carbon atoms; n represents an integer of from 5 to 10,000; and p represents an integer of from 1 to 10.) or Formula (c)

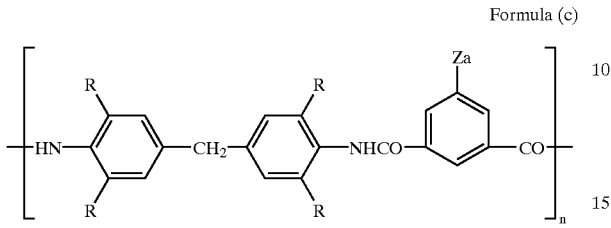

wherein, R has the same meanings as in the above-described formula:(a), Za represents a group selected from the group consisting of the following formula (Za1), (Za2) and (Za3)

—CH=C($X_1$)($X_2$)  (Za1), (wherein one of $X_1$ and $X_2$ represents hydrogen atom and the other represents six member aromatic ring or C1–C3 alkoxycarbonyl group, or $X_1$ and $X_2$ may combined each other and represents a group —S—o—Phe—CO—), —NH—N=C($X_3$)($X_4$)  (Za2)

(wherein one of $X_3$ and $X_4$ represents hydrogen atom and the other represents a group -ring B–Y wherein each group of "ring B" and Y means same group as mentioned in the formula (b) or a lower alkoxycarbonyl group, or $X_3$ and $X_4$ may combined each other and represents a group —CH=N—N(lower alkyl)—CO—), and —N=CH-ring B—Y  (Za3)

wherein each group of "ring B" and Y means same a group as mentioned in the formula (b), 2 the polyimide compounds represented by the following formula;

Formula (d)

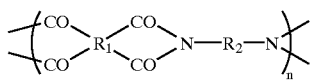

(wherein $R_1$ represents the residue of a tetracarboxylic acid, $R_2$ represents formula (e)

(e)

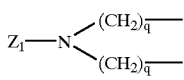

or formula (f)

(f)

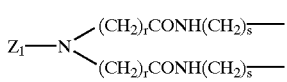

(wherein Z1 represents following formula

Y—$C_6H_4$—N=N—$B_0$—,

Y—$C_6H_4$—CH=N—$B_0$— or

Y—$C_6H_4$—N=CH—$B_0$— wherein Y has the same meanings as in the above-described formula (b) and $B_0$ represents a group "ring B" mentioned above or formula —$C_6H_4$—O($CH_2$)p CO—), q represents an integer of from 2 to 4, r represents an integer of from 1 to 5, s represents an integer of 2 to 8 and n represents an integer of 2 to 10,000}, 3 the polyurethane compounds represented by the following formula;

Formula (g)

—[HN—$R_2$—NHCOO—$R_3$—OCO]$_n$—

{wherein $R_2$ has the same meaning as in the above-described formula (d); $R_3$ represents —($CH_2$)$_m$— (wherein m represents from 2 to 8); and n represents an integer of from 5 to 10,000} and 4 the polyester compounds represented by the following formula;

Formula (h)

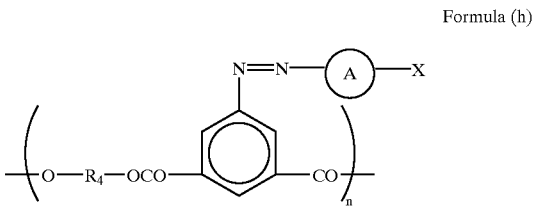

or formula (i)

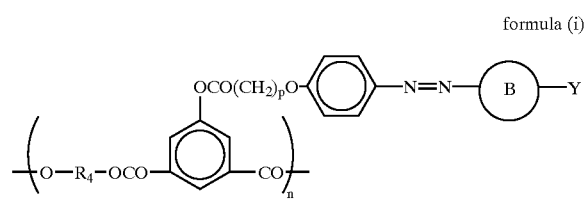

(wherein, a ring A, X, a ring B, Y, p, and n have the same meanings in the above-described formula (a) or (b); and $R_4$ represents a benzene ring, a naphthalene ring, a C4–C6 methylene group).

The liquid crystalline high molecular compound having a photoactive group used in the invention is a high molecular compound causing a molecular axis orientation change of the photoactive group by the irradiation of a linearly polarized light. The molecular axis orientation change described above is a phenomenon that after absorbing the light energy of a linearly polarized light, the direction of the molecular axis thereof is changed. As the photoactive group for the purpose, a group containing at least one double bond selected from C=C, C=N, and N=N, the double bond being a non-aromatic is effectively used. The wavelength of the light which is absorbed by the liquid crystalline high molecular compound having the photoactive group includes not only the wavelengths of a visible light region but also the wavelengths of the regions of ultraviolet rays and infrared rays. By irradiating the thin film of the liquid crystalline high molecular compound having the photoactive group with a linearly polarized light containing the wavelength range of being absorbed by the compound, the molecular axis orientation is easily caused.

Practical examples of the monomer having the photoactive group used in the invention are shown below.

As a diamine for the polyamide compound, a compound of following formula (j) can be used.

Formula (j)

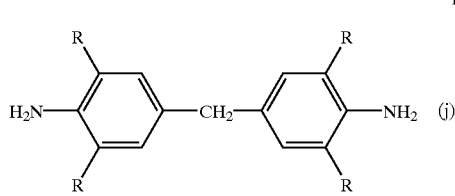

wherein R has the same meanings as in the above-described formula (a).

As a tetracarboxylic acid for the polyimide compounds, there are a C4–C6 alicyclic or aromatic tetracarboxylic acid wherein the alicyclic or aromatic ring may contain one or two hetro atoms such as nitrogen or oxygen atom, a tetracarboxylic acid which has the carboxyl groups on a C8–C10 condensed ring such as naphthalene tetracarboxylic acid and a tetracarboxylic acid wherein two C4–C6 alicyclic or aromatic ring having two carboxyl groups are linked each other with or without linkage group such as a lower alkylene group, carbonyl group or oxygen atom.

As a carboxyloxy compound for the polyurethane compounds, a compound represented by a following formula(k) or a unhydride thereof can be used.

$$HOCO-O-R_3-OCOOH \quad (k)$$

(wherein $R_3$ has the same meanings as in the above-described formula (g)).

As a diol for the polyamide compound, a compound of following formula (1) can be used.

$$HO-R_4-OH \quad (1)$$

wherein $R_4$ has the same meanings as in the above-described formula (h))

The said diols are for example tetramethyreneglycol and, hexamethyreneglycol.

As the group having a non-aromatic N=N bond, there are aromatic azo groups such as azobenzene group, azonaphthalene group, a bisazo group, a formazan group, etc., and further an azoxybenzene group. The examples of them are shown below but the monomer used in the invention is not limited to them.

As the monomers of the polyamide compound and the polyester compounds, there are;

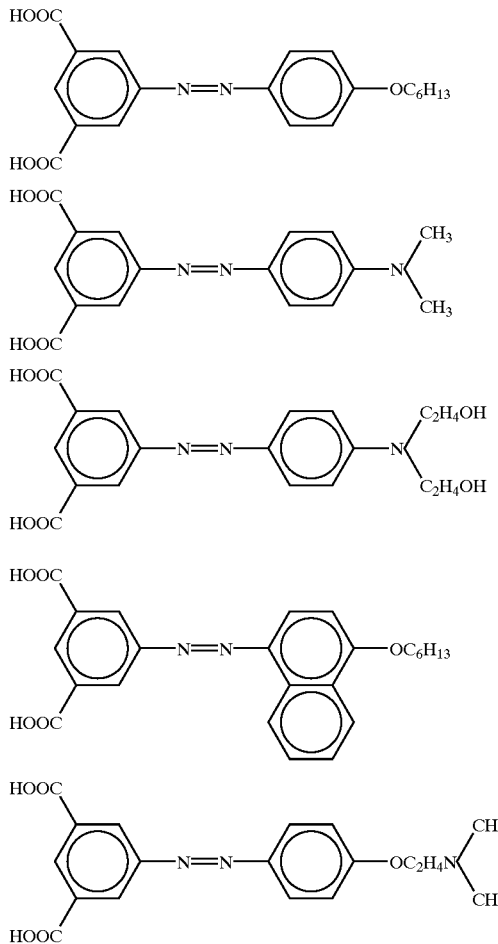

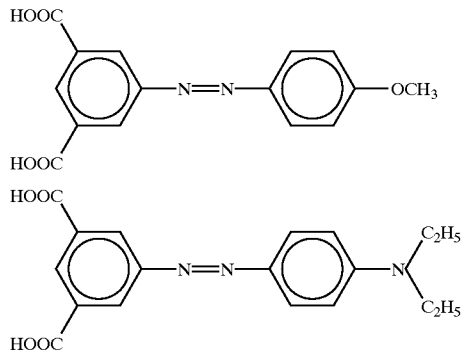

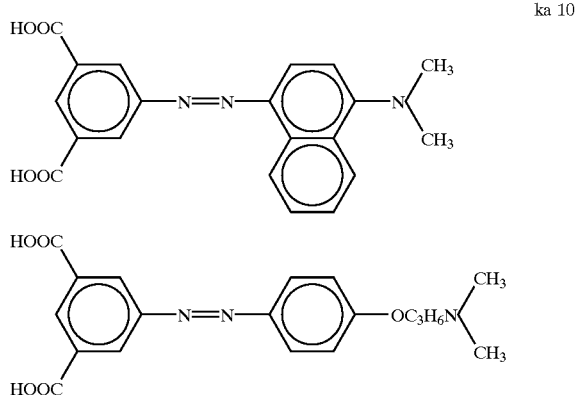

-continued
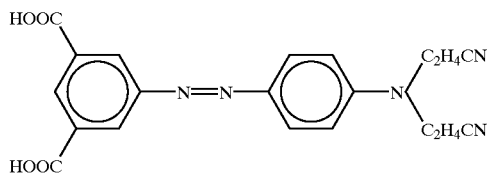
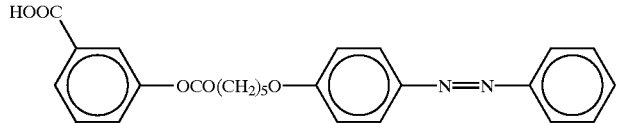
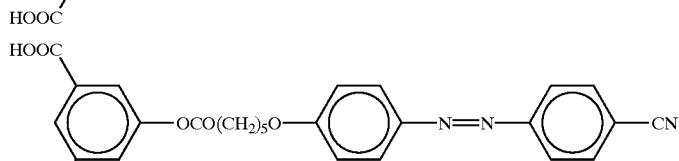
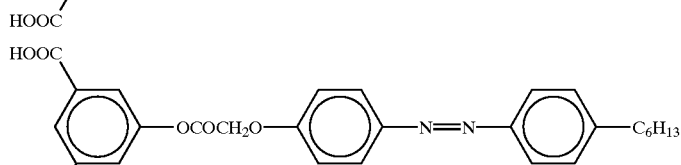
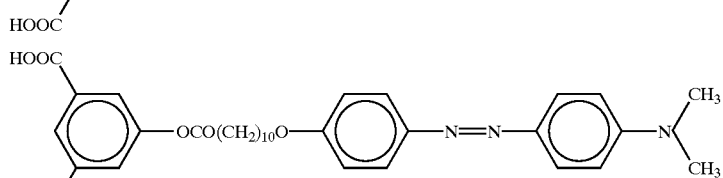
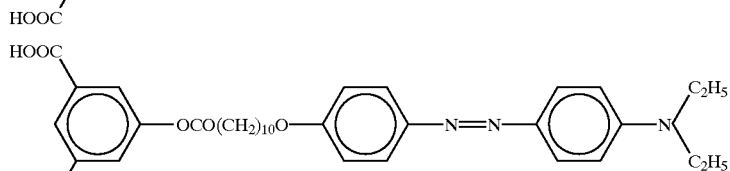
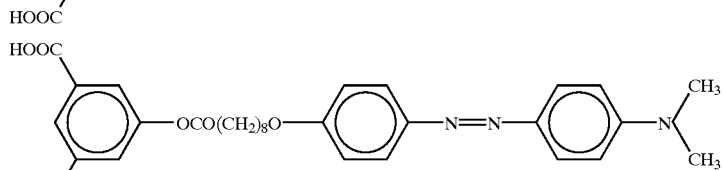
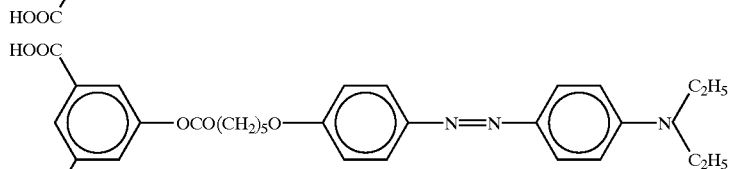
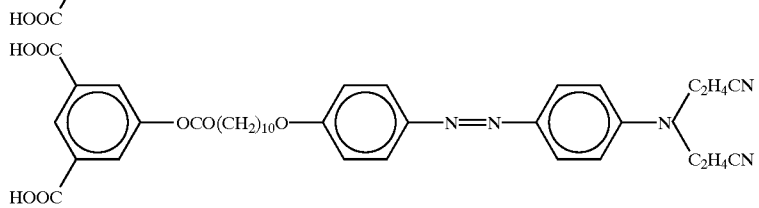

-continued

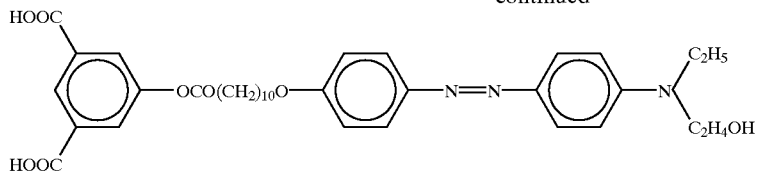

As the monomers of the polyimide compound and the polyurethane compounds, there are for example;

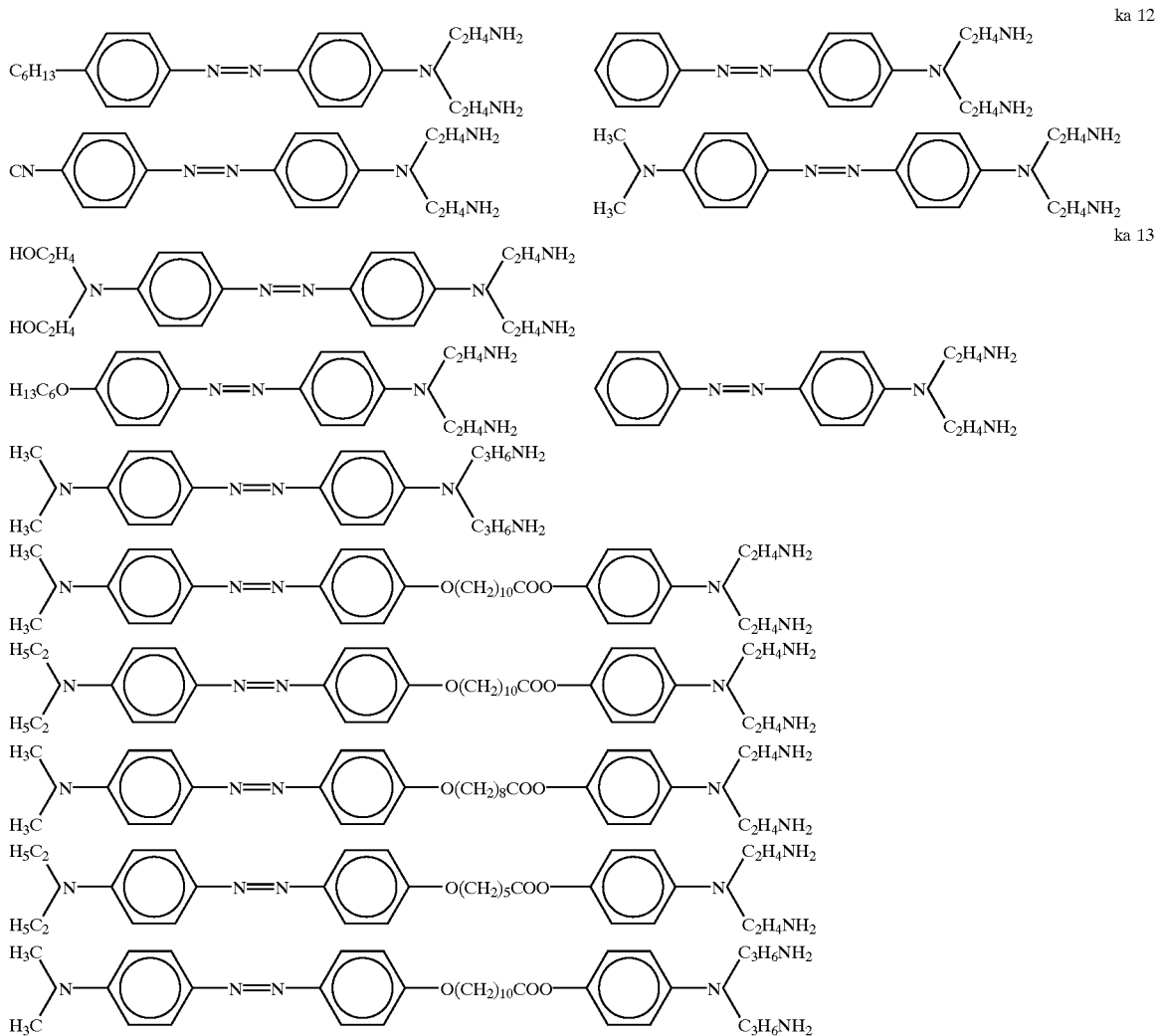

As the group having a non-aromatic C=N bond, there are an aromatic Schiff base an aromatic hydrazone group, etc. The examples of them are shown below but the invention is not limited to them.

As the monomers of the polyamide compound and the polyester compound are;

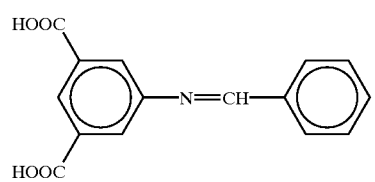

-continued

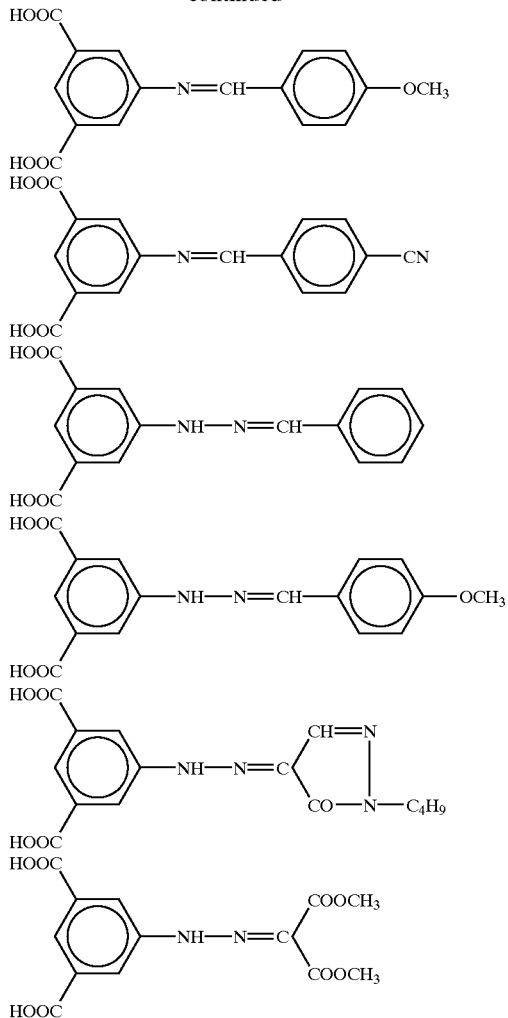

As the monomers of the polyimide compound and the polyurethane compound are;

Ka 15

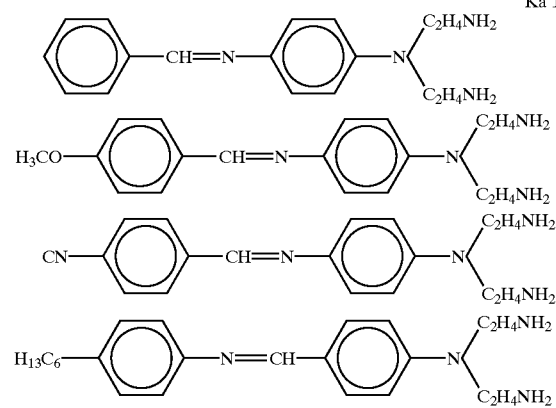

As the group having a non-aromatic C=C bond, there are groups such as a polyene, stylbene, stylbazole, stilbazolium, cinnamic acid, indigo, thio indigo, hemithioindigo, etc. The examples of them are shown below but the invention is not limited to them.

As the monomers of the polyamide compound and the polyester compound, there are

Ka 16

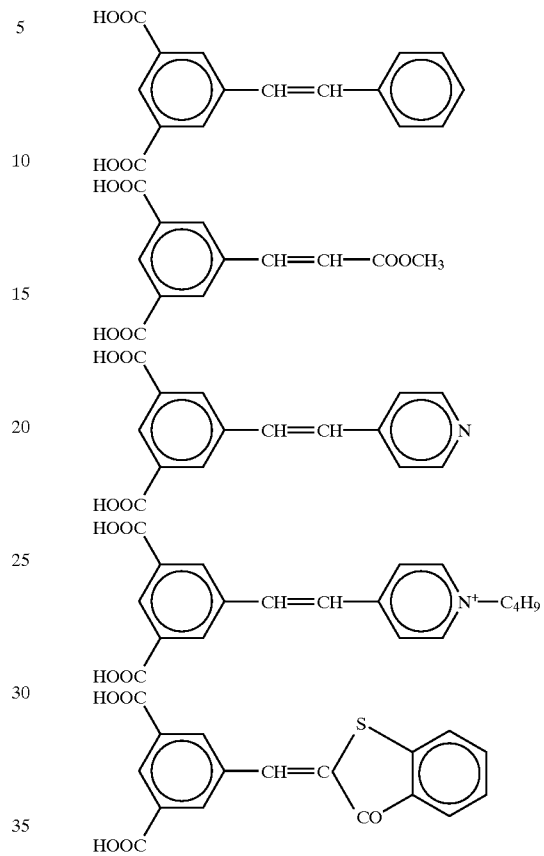

As the monomers of the polyimide compound and the polyurethane compound, there are;

Ka 17

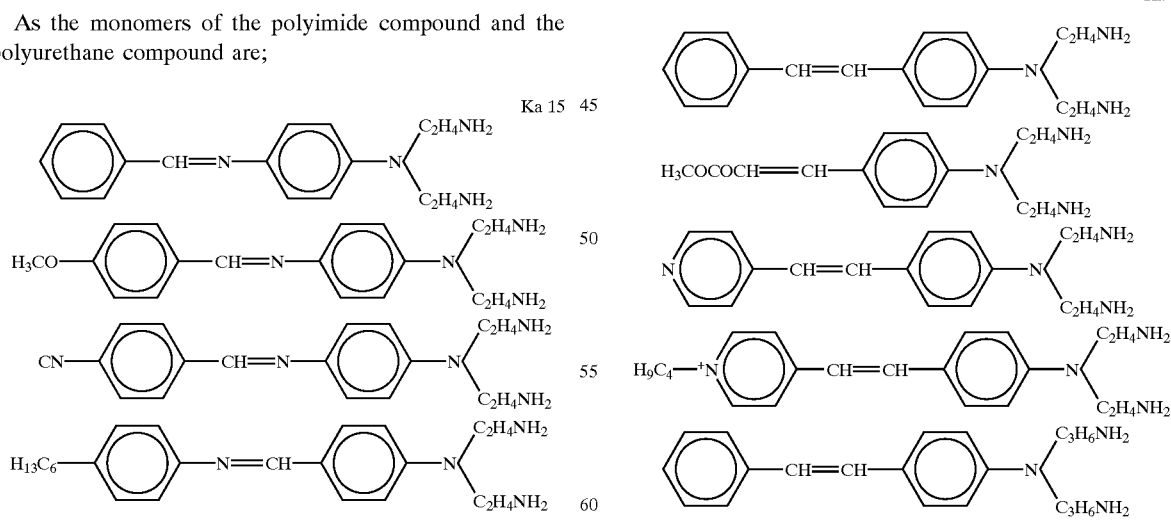

As a method of forming the thin film of the liquid crystalline having the photoactive group on a substrate, a rotary coating method is preferred. Also, the thin film of this kind of the liquid crystalline high molecule may be formed on a substrate by a Langmuir-Blodgett method. Furthermore, a substrate may be immersed in a solution of the liquid crystalline high molecule to adsorb the high molecule on the substrate. The film thickness is sufficiently 1 µm or thinner.

As a method of irradiating the thin film of the liquid crystalline high molecule having a the photoactive group formed on a substrate by a linearly polarized light, various known methods can be applied. To produce a micropattern polarized element, it is necessary to apply a polarized light pattern onto the thin film of the liquid crystalline high molecule having the photoactive group and for the purpose, the thin film may be irradiated by a linearly polarized light through a desired mask pattern. Or, a laser light having a polarized light property is condensed using a lens, etc., and by actuating the condensed laser light, the thin layer may be irradiated by the laser light in a pattern form. The exposure light energy is desirably in the range of from 1 mJ/cm$^2$ to 10 j/cm$^2$. The molecular axis orientation change by the irradiation of a linearly polarized light to the thin film is reversible and thus by irradiating linearly polarized lights each having a different polarized light axis per each mask pattern, patterns can be freely superposed. In addition, when one polarized light element (sheet) having a complicated patter is produced, by using the polarized element (sheet) as a mask pattern, many polarized elements (sheets), the production of many such polarized elements has hitherto been difficult, can be produced by a simple method of a linearly polarized light irradiation.

By only adsorbing dichroic dye molecules in a micropattern form to the thin film of the liquid crystalline high molecule having the photoactive group, wherein the molecular axes are arranged in a definite direction, thus obtained, that is, by only forming the dichroic dye molecules E in a micropattern form on the thin film described above, the molecular axes of the dichroic dye molecules are arranged to the arranged direction of the molecular axes of the photoactive group, that is, the molecular axes of the dichroic dye molecules are arranged to the direction defined by the polarized light axis of the linearly polarized light irradiated onto the thin film, and the polarized light axis is fixed to show the property as a micropattern polarized element.

More practically explaining the above-described matter, a solution of a dichroic dye is coated on a substrate having thereon the thin film of the liquid crystalline high molecular having the photoactive group, wherein the molecular axes are arranged to a definite direction, and the solvent is evaporated off under a desired humidityetemperature condition to form the thin film of the dye in a micropattern form. In this case, the molecular axes of the dyes are arranged to the direction defined by the polarized light axis of the linearly polarized light irradiated to the thin film of the liquid crystalline high molecule having the photoactive group, and the light-absorbed axes of the thin film of the dyes are fixed to show the property as a micropattern polarized element.

As the solvent for dissolving the dichroic dye, an aprotic polar solvent such as water, alcohols, ethers, pyridine, dimethylformamide (DMF), dimethyl sulfoxide (DMSO), N-methylpyrrolidinone (NMP), dimethylacetamide (DMAC), dimethylimidazoline (DMI), etc., is preferred. Particularly, a mixed solution made of water as the principal constituent is preferred. In this case, the mixed amount of an organic solvent is optional but is preferably from 0 to 70% by weight, and particularly preferably from 0 to 50% by weight. Also, a small amount of a surface active agent may be added to the solution.

The temperature humidity condition of forming the dye thin film by evaporating off the solvent of the dichroic dye solution is an important condition of controlling the performance of the dye thin film as the polarized element. The condition is determined by the solvent condition, the kind of the dye, the dye concentration, the coated thickness of film, etc., but the temperature is from 0 to 200° C., and preferably from 5 to 50° C., and the humidity is from 20 to 80% RH, and preferably from about 40 to 70% RH.

The dichroic compound used in the invention is a compound showing a lyotropic liquid crystalline property under definite conditions of the solvent composition, the dye concentration, and the temperature, forms an associated aggregate called a chromonic liquid crystal phase, and the aggregate shows a polarization property by arranging to a definite direction. Also, because plural molecules are associated, the dichroic dye has a feature of excellent in the light-fastness. As the dichroic dye, for example, a compound having an aromatic ring structure is preferred. As the aromatic ring structure, in addition of benzene, naphthalene, and phenanthrene; heterocyclic rings such as thiazole, pyridine, pyrimidine, pyridazine, pyrazine, quinoline, etc., and the quaternary salts of them; and further the condensed rings of them and benzene, naphthalene, etc., are particularly preferred. Also, it is preferred that a hydrophilic substrate such as a sulfonic group, a carboxylic group, an amino group, a hydroxyl group, etc., is introduced in these aromatic rings.

Examples of the dichroic dye include azo-base dyes, cyanine-base dyes, anthraquinone-base dyes including condensed-base such as indanthrone, etc., stilbene-base dyes, pyrazolone-base dyes, perylene-base dyes, naphthalimide-base dyes, triphenylmethane-base dyes, quinoline-base dyes, oxazine-base dyes, thiazine-base dyes, quinophthalone-base dyes, indigo-base dyes, thioindigo-base dyes, etc. In these dyes, water-soluble dyes are preferred but other dyes can be, as a matter of course, used in the invention.

Practical examples of the dichroic dye include, C.I. Direct Blue 1, C.I. Direct Blue 15, C.I. Direct Blue 67, C.I. aDirect Blue 78, C.I. Direct Blue 83, C.I. Direct Blue 90, C.I. Direct Blue 98, C.I. Direct Blue 151, C.I. Direct Blue 168, C.I. Direct Blue 202, C.I. Direct Green 51, C.I. Direct Green 59, C.I. Direct Green 85, C.I. Direct Violet 9, C.I. Direct Violet 48, C.I. Direct Red 2, C.I. Direct Red 39, C.I. Direct Red 79, C.I. Direct Red 81, C.I. Direct Red 83, C.I. Direct Red 89, C.I. Direct Orange 39, C.I. Direct Orange 41, C.I. Direct Orange 49, C.I. Direct Orange 72, C.I. Direct Yellow 12, C. I. Direct Yellow 26, C. I. Direct Yellow 44, C.I. Direct Yellow 50, C.I. Acid Red 37, C.I. No. 27865, C.I. No. 27915, C.I. No. 27920, C.I. No. 29058, C.I. No. 29060, disulfoindanthrone, and disulfo-N,N'-dixylylperylenetetracarbodiimide.

Then, several practical examples of the dichroic dye are shown below by structural formulae.

Ka 18
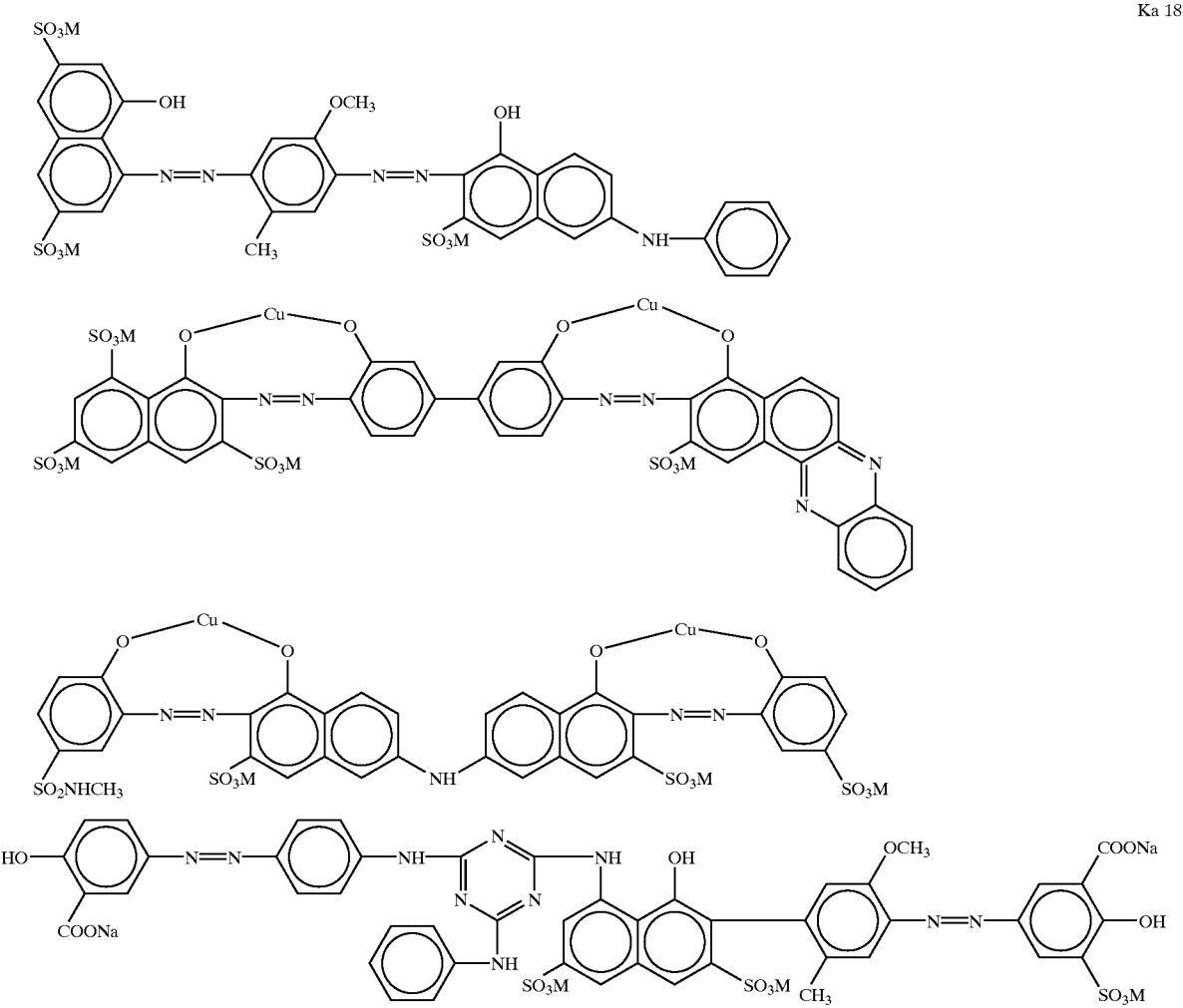
Ka 19
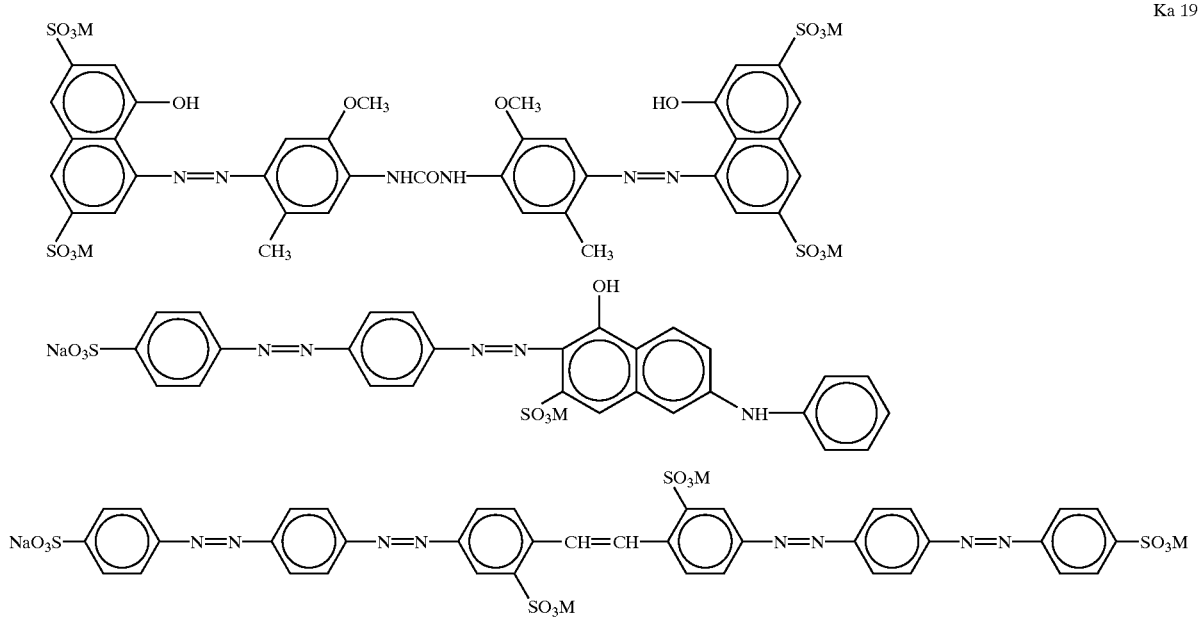

-continued
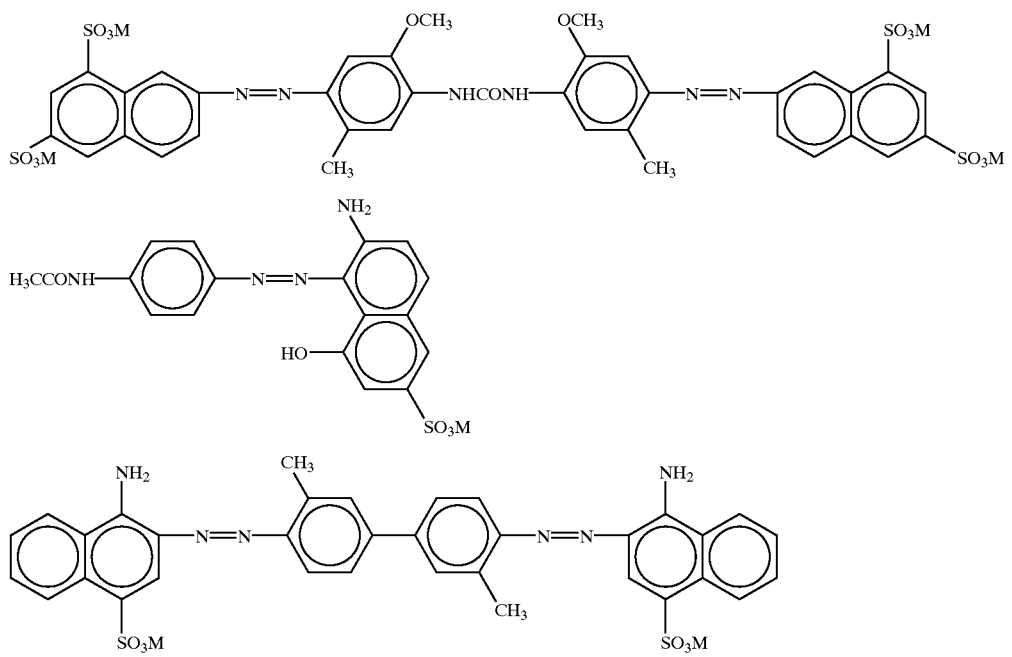
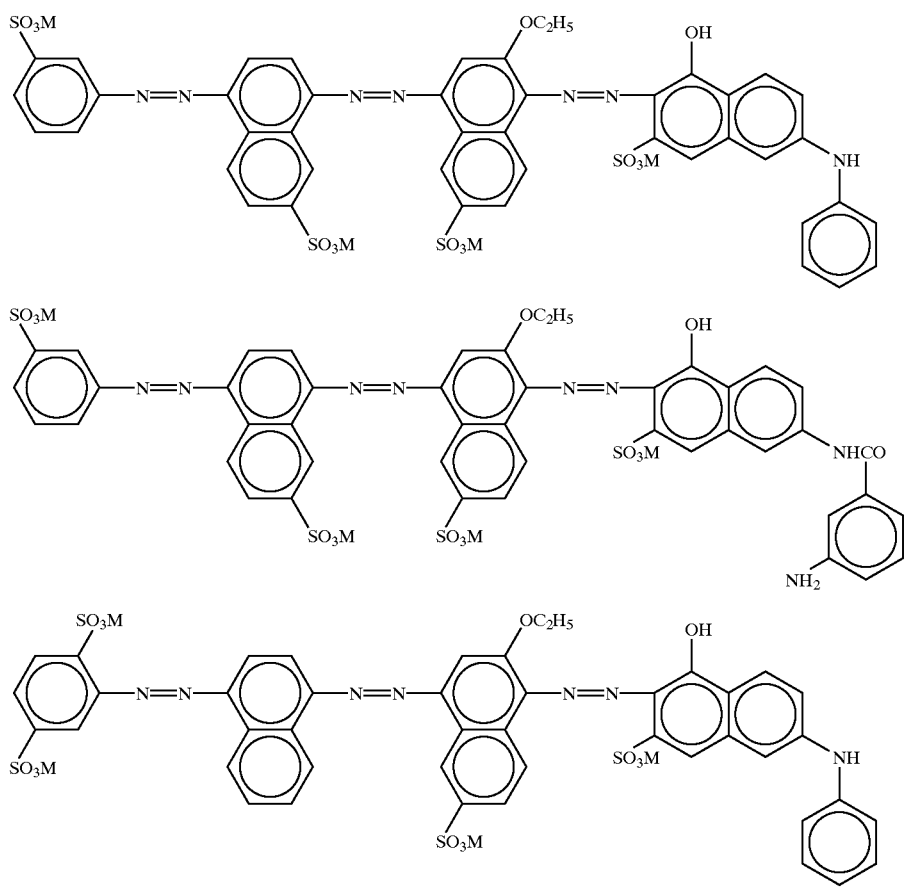
Ka 20

-continued
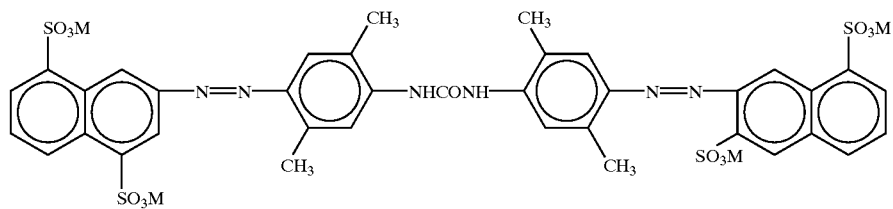
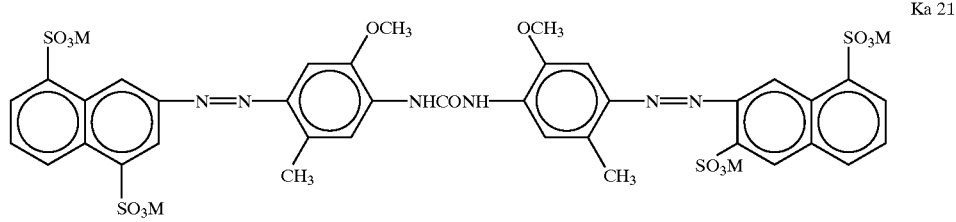
Ka 21
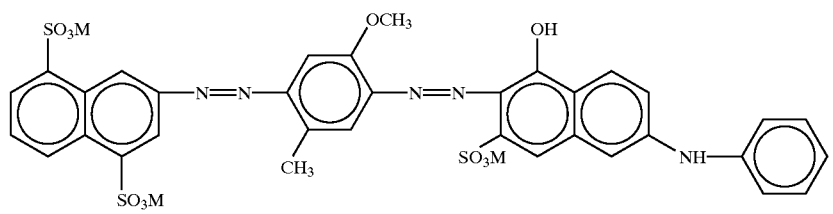
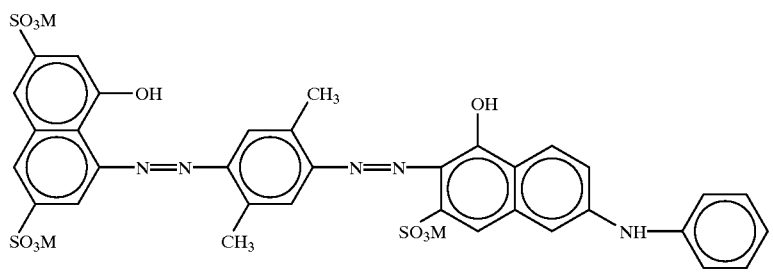
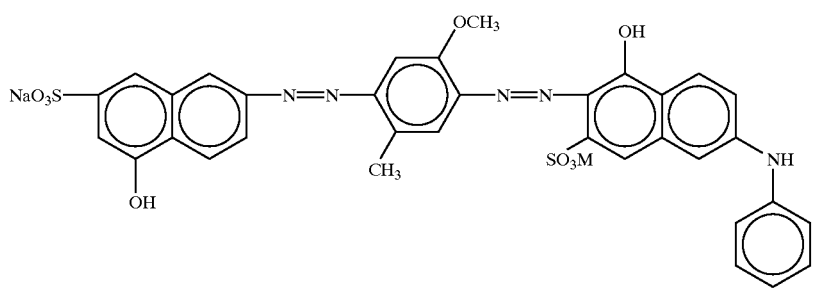
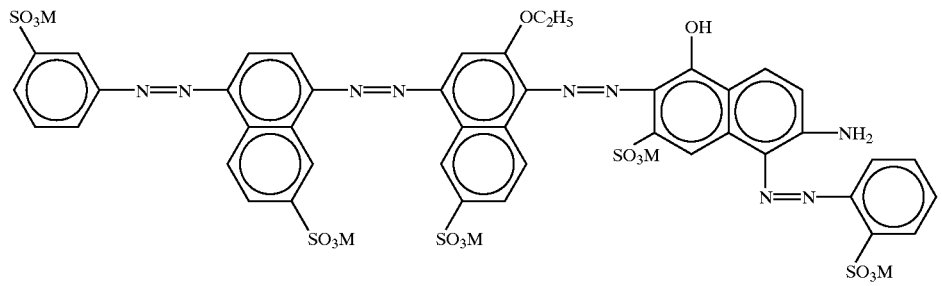
Ka 22

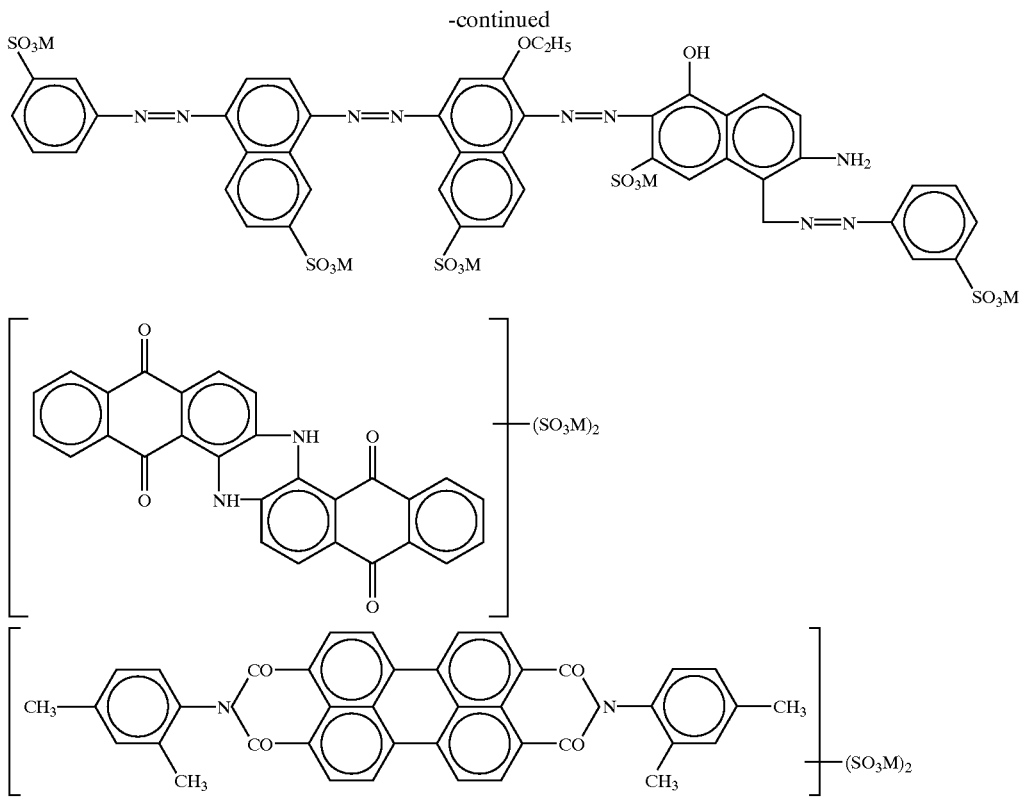

Then, the invention is practically explained by the following examples but the invention is not limited to these examples. All parts in these examples, unless otherwise indicated, are by weight.

EXAMPLE 1

Synthesis of polyamide compound (1):

To 50 parts of NMP are added 3.7 parts of 5-(4'-n-hexyloxyphenylazo)isophthalic acid and 3.1 parts of 4,4'-diamino-3,5,3',5'-tetraethyldiphenylmethane (TEDPM: manufactured by NIPPON KAYAKU CO., LTD.) followed by dissolving with stirring. Then. 9.3 parts of triphenyl phosphite and 2.4 parts of pyridine are added to the solution and the reaction is carried out at 100° C. for 10 hours with stirring. After finishing the reaction, 30 parts of water is added to the reaction mixture, the supernatant liquid is removed by decantation and 100 parts of an aqueous solution of 2% sodium carbonate is added to the residue followed by stirring overnight to form crystals. The crystals formed are collected by filtration, washed with water, and dried to provide 6.4 parts of a polyamide compound (1). The product is dissolved in a small amount of NMP by heating, and the solution is diluted with methanol to purify the product by re-precipitation.

Preparation of photoactive group-containing polyamide thin film and irradiation of linearly polarized light:

In 98 parts of NMP is dissolved 2 parts of the purified product of the above-described polyamide compound (1) to prepare a solution of 2% the polymer. Then, the solution is spin-coated on a glass substrate at a dry film-thickness of from about 0.6 to 0.7 μm and the coated film is dried by heating to 180° C. for 10 minutes to form the thin film of the polyamide. Using a super high-pressure mercury lamp (500 W/hr.), a visible light is obtained with a 400 nm cut-off filter, and further after making a linearly polarized light through a polarizing plate, the film surface of the glass substrate having formed thereon the polyamide thin film is irradiated via a stripe-form mask with the linearly polarized light for one minute from a distance of 50 cm, whereby the molecular axes of the photoactive groups of the portion irradiated with the linearly polarized light are arranged to a definite direction.

Preparation of associating dichroic dye thin film:

In 8.98 parts of deionized water are dissolved 1 part of C.I. Direct Blue 67 and 0.02 part of Emulgen 108 (trade name, nonionic surface active agent, manufactured by Kao Corporation) by heating to prepare a dye solution. The dye solution is spin-coated on the film surface of the above-described polyamide thin film-having substrate and dried under the conditions of 40° C. and 60% RH to obtain a stripe-form polarized element of the invention. The visible absorption spectrum thereof is shown in FIG. 1. The dichroic ratio in the absorption maximum wavelength is 25.

Synthesis of 5-(4'-n-hexyloxy)phenylazoisophthalic acid used as the raw material of the polyamide compound (1):

To 70 parts of water are added 21.9 parts of 5-aminoisophthalic acid diethyl ester and 31 parts of 6 N hydrochloric acid and the mixture is cooled by adding ice-water. In 20 parts of water is dissolved 6.4 parts of sodium nitrite and the solution is added to the above-described mixture to azotize. Apart from this, a coupling solution of 8.7 parts of phenol, 11.2 parts of sodium carbonate, and 100 parts of water is prepared and cooled with ice-water. To the coupling solution is added the above-described diazonium solution at a temperature of 5° C. or lower and the mixture is stirred overnight at a temperature of 10° C. or lower. Then, 20 parts of 6 N hydrochloride acid is added to the mixture and the precipitates formed are collected by filtration, washed with water, and dried to obtain 28.7 parts of a monoazo dye, 5-(4'-oxy) phenylazoisophthalic acid diethyl ester. Then, to 60 parts of DMF are added 11.6 parts of the above-described monoazo dye, 3.6 parts of sodium carbonate, and 8.4 parts of n-hexyl bromide and the reaction is carried out at 100° C. for 10 hours with stirring. After finishing the reaction, 120 parts of water is added to the reaction mixture and the mixture is stirred overnight to form crystals, which are collected by filtration and washed with water. Furthermore, the wet cake obtained is added to a solution formed by dissolving 4.1 parts of sodium hydroxide in 60 parts of methanol and the reaction is carried out at a temperature of from 55 to 65° C. for 4 hours with stirring. After finishing the reaction, 200 parts of water is added to the reaction mixture, after confirming that the reaction product is completely dissolved, 6 N hydrochloric acid is added to the solution to neutralize, and crystals thus precipitated are collected by filtration, washed with water, and dried to obtain 5.6 parts of 5-(4'-n-hexyloxy)phenylazoisophthalic acid.

EXAMPLE 2

Synthesis of polyamide compound (2):

To 50 parts of NMP are added 3.0 parts of 5-(4'-methoxyphenylazo)isophthalic acid and 3.1 parts of 4,4'-diamino-3,5,3',5'-tetraethyldiphenylmethane (TEDPM) followed by dissolving with stirring. Then, 9.3 parts of triphenyl phosphite and 2.4 parts of pyridine are added to the solution and the reaction is carried out at 100° C. for 10 hours with stirring. After finishing the reaction, 30 parts of water is added to the reaction mixture, the supernatant liquid is removed by decantation and 100 parts of an aqueous solution of 2% sodium carbonate is added to the residue followed by stirring overnight to form crystals. The crystals formed are collected by filtration, washed with water, and dried to provide 5.7 parts of a polyamide compound (2). The product is dissolved in a small amount of NMP by heating, and the solution is diluted with methanol to purify the product by re-precipitation.

Preparation of photoactive group-containing polyamide thin film and irradiation of linearly polarized light:

In 98 parts of NMP is dissolved 2 parts of the purified product of the above-described polyamide compound (2) to prepare a solution of 2% the polymer. The polyamide thin film is formed according to the same manner as in Example 1, the film surface of the glass substrate having formed thereon the polyamide thin film is irradiated via a stripe-form mask with the linearly polarized light for one minute from a distance of 50 cm, whereby the molecular axes of the photoactive groups of the portion irradiated with the linearly polarized light are arranged to a definite direction.

Preparation of associating dichroic dye thin film:

In 8.98 parts of demonized water are dissolved 1 part of Benzopurpurine 4B and 0.02 part of Emulgen 108 (trade name, nonionic surface active agent, manufactured by Kao Corporation) by heating to prepare a dye solution. The dye solution is spin-coated on the film surface of the above-described polyamide thin film-having substrate and dried under the conditions of 40° C. and 60% RH to obtain a stripe-form polarized element of the invention. The visible absorption spectrum thereof is shown in FIG. 2. The dichroic ratio in the absorption maximum wavelength is 30.

Synthesis of 5-(4'-methoxyphenyl)isophthalic acid used as the raw material of the polyamide compound (2):

To 100 parts of DMF are added 17.1 parts of the monoazo dye, 5-(4'-oxyphenylazo)isophthalic acid diethyl ester obtained in Example 1, 5.3 parts of sodium carbonate, and 18.6 parts of methyl toluenesulfonate and the reaction is carried out at 100° C. for 10 hours. After finishing the reaction, 200 parts of water is added to the reaction mixture and the mixture is stirred overnight to precipitate crystals, which are collected by filtration and washed with water. Furthermore, the wet cake obtained is added to a solution formed by dissolving 6.0 parts of sodium hydroxide in 100 parts of methanol and the reaction is carried out at a temperature of from 55 to 65° C. for 5 hours with stirring. After finishing the reaction, 200 parts of water is added to the reaction mixture, after confirming that the reaction product is completely dissolved, 6 N hydrochloric acid is added to the solution to neutralize, and crystals thus precipitated are collected by filtration, washed. with water, and dried to obtain 12.7 parts of 5-(4'-methoxyphenylazo) isophthalic acid.

EXAMPLE 3

Synthesis of polyamide compound (3):

To 50 parts of NMP are added 3.1 parts of 5-(4'-dimethylaminophenylazo)isophthalic acid and 3.1 parts of 4,4'-diamino-3,4,3',5'-tetraethyldiphenylmethane (TEDPM: manufactured by NIPPON KAYAKU CO., LTD.) followed by dissolving with stirring. Then, 9.3 parts of triphenyl phosphate and 2.4 parts of pyridine are added to the solution and the reaction is carried out at 100° C. for 10 hours with stirring. After finishing the reaction, 50 parts of water is added to the reaction mixture, the supernatant liquid is removed by decantation and 100 parts of an aqueous solution of 2% sodium carbonate is added to the residue followed by stirring overnight to form crystals. The crystals formed are collected by filtration, washed with water, and dried to provide 5.9 parts of a polyamide compound (3). The product is dissolved in a small amount of NMP by heating, and the solution is diluted with methanol to purify the product by re-precipitation.

Preparation of photoactive group-containing polyamide thin film and irradiation of linearly polarized light:

In 98 parts of NMP is dissolved 2 parts of the purified product of the above-described polyamide compound (3) to prepare a solution of 2% the polymer. Then, the solution is spin-coated on a glass substrate at a dry film-thickness of from about 0.6 to 0.7 μm and the coated film is dried by heating to 180° C. for 10 minutes to form the thin film of the polyamide. Using a super high-pressure mercury lamp (500 W/hr.), a visible light is obtained with a 500 nm cut-off filter, and further after making a linearly polarized light through a polarizing plate, the film surface of the glass substrate having formed thereon the polyamide thin film is irradiated via a stripe-form mask with the linearly polarized light for one minute from a distance of 50 cm, whereby the molecular axes of the photoactive groups of the portion irradiated with the linearly polarized light are arranged to a definite direction.

Preparation of associating dichroic dye thin film:

In 8.98 parts of deionized water are dissolved 1 part of C.I. Direct Blue 67 and 0.02 part of Emulgen 108 (trade name, nonionic surface active agent, manufactured by Kao Corporation) by heating to prepare a dye solution. The dye solution is spin-coated on the film surface of the above-described polyamide thin film-having substrate and dried under the conditions of 40° C. and 60% RH to obtain a stripe-form polarized element of the invention. The visible absorption spectrum thereof is shown in FIG. 3. The dichroic ratio in the absorption maximum wavelength is 25.

Synthesis of 5-(4'-dimethylaminophenylazo)isophthalic acid used as the raw material of the polyamide compound (3):

To 100 parts of ice-water are added 9.05 parts of 5-aminoisophthalic acid and 17 parts of 6 N hydrochloric acid followed by cooling with ice-water. In 10 parts of water is dissolved 3.45 parts of sodium nitride and the solution is added to the above-described solution to perform the diazotization. Apart from this, a coupling solution of 6.3 parts of N,N-dimethylaniline, 8.5 parts of 6 N hydrochloride acid, and 60 parts of ice-water is prepared and cooled with ice-water. To the coupling solution is added the above-described diazonium solution at a temperature of 5° C. or lower and after adding thereto a solution of 2% sodium carbonate, the resultant mixture is stirred overnight at a temperature of 10° C. or lower while keeping the pH of from 4 to 6. Crystals thus precipitated are collected by filtration, washed with water, and dried to obtain 15.5 parts of a monoazo dye, 5-(4'-dimethylaminophenylazo)isophthalic acid.

EXAMPLE 4

Synthesis of polyamide compound (4):

To 50 parts of NMP are added 5.9 parts of 5-(4'-(4"-dimethylaminophenylazo)phenoxyundecanoyloxy)isophthalic acid and 3.1 parts of 4,4'-diamino-3,5,3',5'-tetraethyldiphenylmethane (TEDPM) followed by dissolving with stirring. Then, 9.3 parts of triphenyl phosphite and 2.4 parts of pyridine are added to the solution and the reaction is carried out at 100° C. for 10 hours with stirring. After finishing the reaction, 30 parts of water is added to the reaction mixture, the supernatant liquid is removed by decantation and 100 parts of an aqueous solution of 2% sodium carbonate is added to the residue followed by stirring overnight to form crystals. The crystals formed are collected by filtration, washed with water, and dried to obtain 8.7 parts of a polyamide compound (4). The product is dissolved in a small amount of NMP by heating, and the solution is diluted with methanol to purify the product by re-precipitation.

Preparation of photoactive group-containing polyamide thin film and irradiation of linearly polarized light:

In 98 parts of NMP is dissolved 2 parts of the purified product of the above-described polyamide compound (4) to prepare a solution of 2% the polymer. The polyamide thin film is formed according to the same manner as in Example 1, the film surface of the glass substrate having formed thereon the polyamide thin film is irradiated via a stripe-form mask with the linearly polarized light for one minute from a distance of 50 cm, whereby the molecular axes of the photoactive groups of the portion irradiated with the linearly polarized light are arranged to a definite direction.

Preparation of associating dichroic dye thin film:

In 8.98 parts of deionized water are dissolved 1 part of C.I. Direct Blue 1 and 0.02 part of Emulgen 108 (trade name, nonionic surface active agent, manufactured by Kao Corporation) by heating to prepare a dye solution. The dye solution is roll-coated on the film surface of the above-described polyamide thin film-having substrate and dried under the conditions of 30° C. and 60% RH to obtain a stripe-form polarized element of the invention. The visible absorption spectrum thereof is shown in the figure. The dichroic ratio in the absorption maximum wavelength is 30.

Synthesis of 5-(4'-(4"-dimethylaminophenylazo)phenoxyundecanoyloxy)isophthalic acid used as the raw material of the polyamide compound (4):

In 30 parts of toluene, 8.5 parts of 4-(4'-dimethylaminophenylazo)phenoxyundecane synthesized from 4-oxy(4'-dimethylaminophenylazo)benzene and 11-bromoundecanoic acid is reacted with 9.6 parts of thionyl chloride at room temperature for 5 hours with stirring, Thereafter, excessive thionyl chloride is distilled off under a reduced pressure and while cooling the residue with ice-water, 20 parts of DMF having dissolved therein 7.5 parts of 5-oxyisophthalic acid ditetrapyranyl ester and 9.6 parts of pyridine is added dropwise to the residue. Then, the reaction is carried out at a temperature of from 5 to 10° C. for 15 hours. After finishing the reaction, the reaction mixture is diluted with 500 parts of an aqueous solution of 2% sodium carbonate and 100 parts of toluene is further added thereto to cause liquid separation. A toluene layer formed is recovered, washed with water, dried with anhydrous sodium sulfate, and thereafter toluene is distilled off under a reduced pressure to obtain an oily product. The oily product is dissolved in 100 parts of dioxane and after adding thereto 10 parts of concentrated hydrochloric acid, the reaction is carried out with stirring to hydrolyze the ester group. The reaction mixture is neutralized with an aqueous solution of 5% sodium carbonate and crystals precipitated are collected by filtration, washed with water, and dried to obtained a crude product of 5-(4'-(4"-dimethylaminophenylazo)phenoxyundecanoyloxy)isophathalic acid. Then, by recrystallizing the crude product from an alcohol, the purified product is obtained.

By following the same procedure as Example 4, the polyamide compounds shown in Table 1 are obtained and the same light orientation effect is obtained.

Ka 23

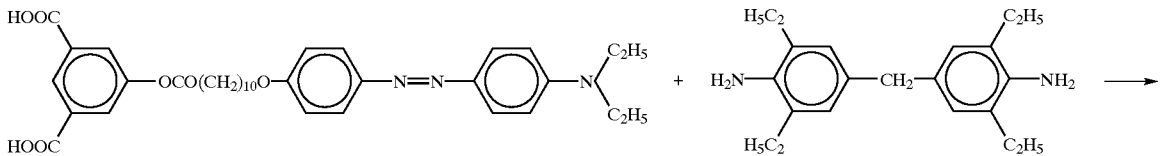

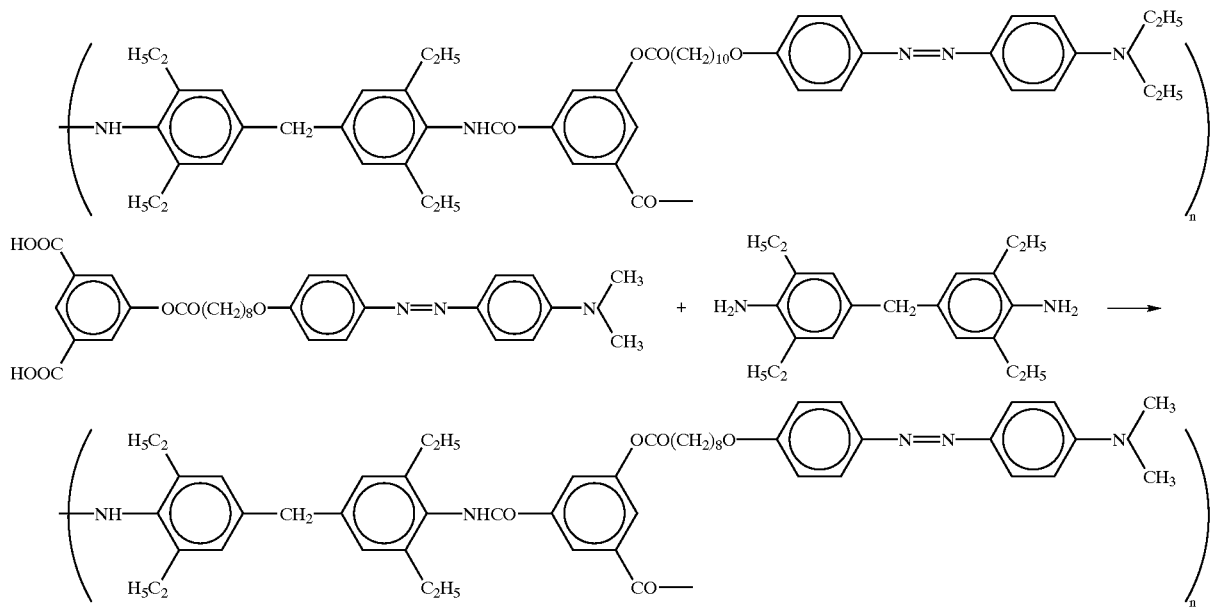
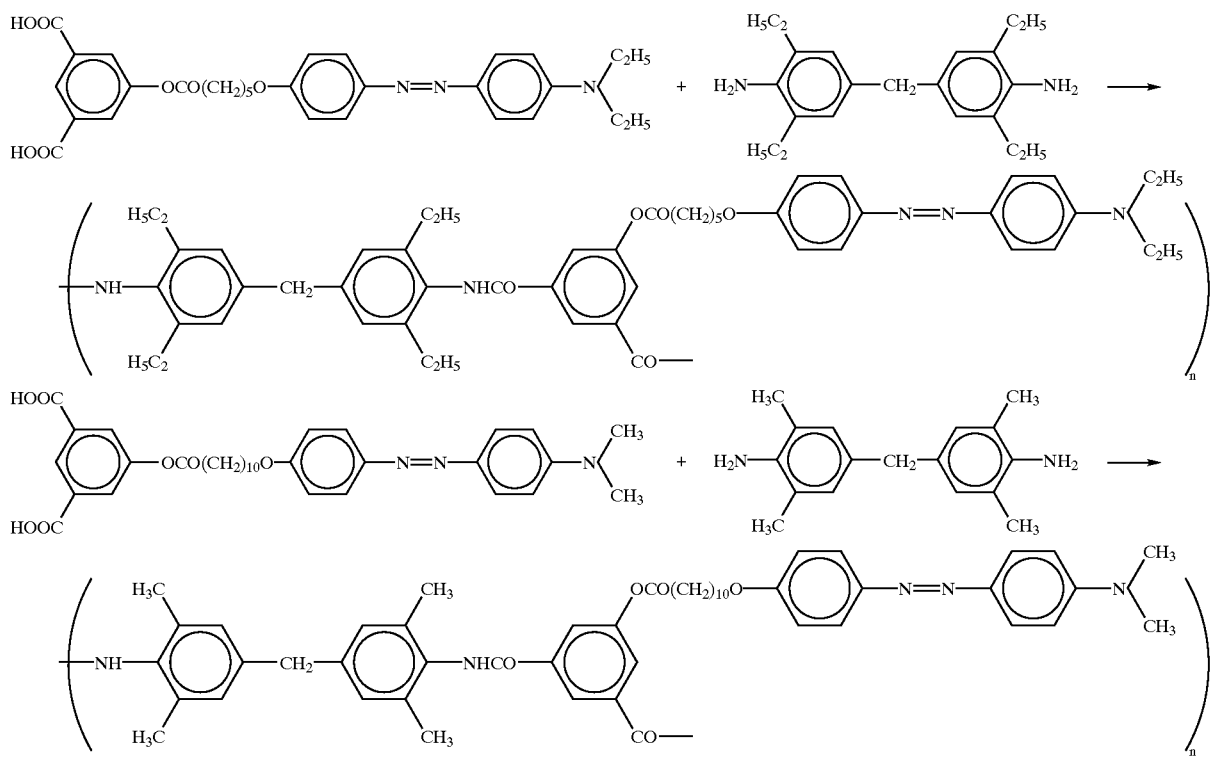
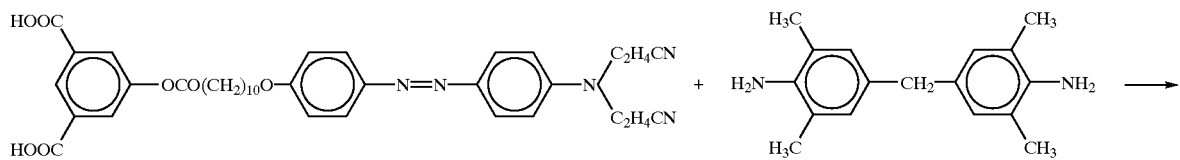

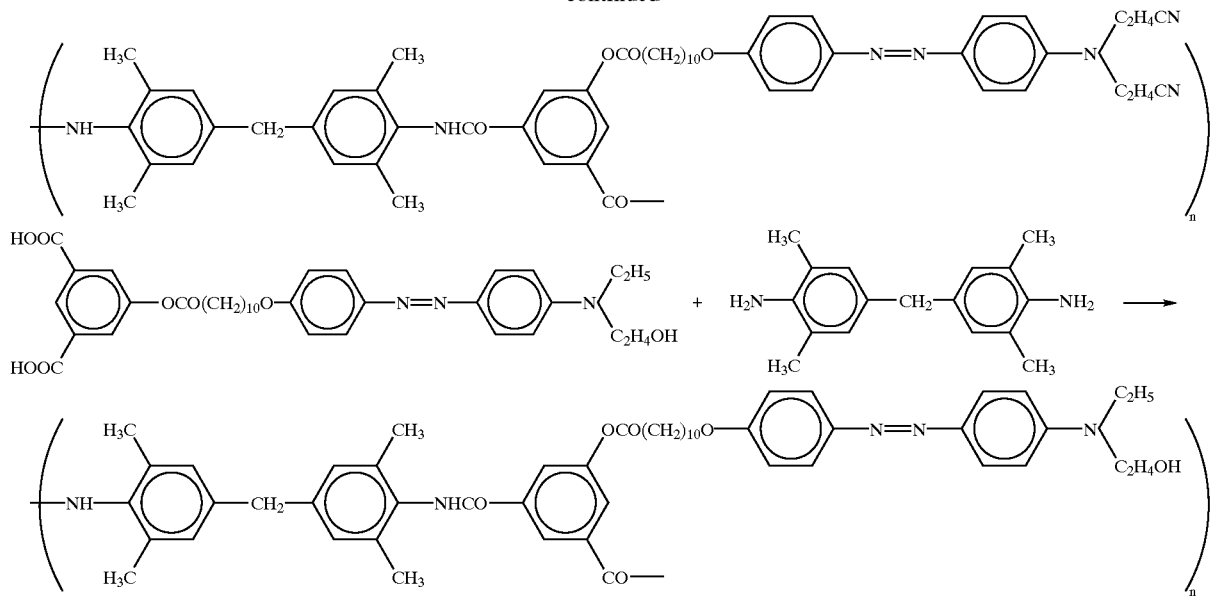

EXAMPLE 5

Other synthetic method of polyamide compound (4):

In 30 parts of toluene, 8.5 parts of 4-(4'-dimethylaminophenylazo)phenoxyundecanoic acid is reacted with 9.6 parts of thionyl chloride at room temperature for 5 hours. Thereafter, excessive thionyl chloride is distilled off under a reduced pressure and while cooling the residue with ice-water, a solution obtained by dissolving 4.6 parts of poly(imino-5-oxyisophthaloylimino-1,4-(3,5-diethyl)phenylenemethylene-1,4-(3,5-diethyl)phenylene and 9.6 parts of pyridine in 100 parts of NMP is added dropwise to the residue, The reaction is carried out at a temperature of from 5 to 10° C. for 15 hours with stirring. After finishing the reaction, the reaction mixture is diluted with 500 parts of an aqueous solution of 2% sodium carbonate and after distilled off toluene, crystals formed are collected by filtration, washed with water, and dried to provide crude polyamide. The crude polyamide is dissolved in a small amount of NMP by heating and the solution is diluted with methanol to purify the product by re-precipitation. From the NMR measurement, it has been clarified that the oxy group of the product is substituted by a 4-(4'-dimethylaminophenylazo)phenoxyundecanolyl group.

EXAMPLE 6

Synthesis of polyamide compound (6):

To 50 parts of NMP are added 3.6 parts of 5-(4'-dimethylaminonaphthylazo)isophthalic acid and 3.1 parts of 4,4'-diamino-3,5,3',5'-tetraethyldiphenylmethane (TEDPM: manufactured by NIPPON KAYAKU CO., LTD.) followed by dissolving with stirring. Then, 9.3 parts of triphenyl phosphite and 2.4 parts of pyridine are added to the solution and the reaction is carried out at 100° C. for 10 hours with stirring. After finishing the reaction, 50 parts of water is added to the reaction mixture, the supernatant liquid is removed by decantation and 100 parts of an aqueous solution of 2% sodium carbonate is added to the residue followed by stirring overnight to form crystals. The crystals formed are collected by filtration, washed with water, and dried to obtained 6.4 parts of a polyamide compound (6). The product is dissolved in a small amount of NMP by heating, and the solution is diluted with methanol to purify the product by re-precipitation.

Preparation of photoactive group-containing polyamide thin film and irradiation of linearly polarized light:

In 98 parts of NMP is dissolved 2 parts of the purified product of the above-described polyamide compound (6) to prepare a solution of 2% the polymer. Then, the solution is spin-coated on a glass substrate at a dry film-thickness of from about 0.6 to 0.7 μm and the coated film is dried by heating to 180° C. for 10 minutes to form the thin film of the polyamide. Using a super high-pressure mercury lamp (500 W/hr.), a visible light is obtained with a 550 nm cut-off filter, and further after making a linearly polarized light through a polarizing plate, the film surface of the glass substrate having formed thereon the polyamide thin film is irradiated via a stripe-form mask with the linearly polarized light for one minute from a distance of 50 cm, whereby the molecular axes of the photoactive groups of the portion irradiated with the linearly polarized light are arranged to a definite direction.

Preparation of associating dichroic dye thin film:

In 8.98 parts of deionized water are dissolved 1 part of C.I. Direct Blue 67 and 0.02 part of Emulgen 108 (trade name, nonionic surface active agent, manufactured by Kao Corporation) by heating to prepare a dye solution. The dye solution is spin-coated on the film surface of the above-described polyamide thin film-having substrate and dried under the conditions of 40° C. and 60% RH to obtain a stripe-form polarized element of the invention. The visible absorption spectrum thereof is shown in FIG. 4. The dichroic ratio in the absorption maximum wavelength is 25.

Synthesis of 5-(4'-dimethylaminonaphthylazo)-isophthalic acid used as the raw material of the polyamide compound (6):

To 100 parts of ice-water are added 9.05 parts of 5-aminoisophthalic acid and 17 parts of 6 N hydrochloric acid followed by cooling with ice-water. In 10 parts of water is dissolved 3.45 parts of sodium nitride and the solution is added to the above-described solution to perform the diazotization. Apart from this, a coupling solution of 8.9 parts of 1-N,N-dimethylnaphthylamine, 8.5 parts of 6 N hydrochloride acid, and 60 parts of ice-water is prepared and cooled with ice-water. To the coupling solution is added the above-described diazonium solution at a temperature of 5° C. or lower and after adding thereto a solution of 2% sodium carbonate, the resultant mixture is stirred overnight at a temperature of 10° C. or lower while keeping the pH of from 4 to 6. Crystals thus precipitated are collected by filtration, washed with water, and dried to obtain 15.8 parts of a monoazo dye, 5-(4'-dimethylamino)naphthylazoisophthalic acid.

EXAMPLE 7

Synthesis of polyamide compound (7):

To 50 parts of NMP are added 3.5 parts of 5-(4'-methoxynaphthylazo)isophthalic acid and 3.1 parts of 4,4'-diamino-3,5,3',5'-tetraethyldiphenylmethane (TEDPM) followed by dissolving with stirring. Then, 9.3 parts of triphenyl phosphate and 2.4 parts of pyridine are added to the solution and the reaction is carried out at 100° C. for 10 hours with stirring. After finishing the reaction, 50 parts of water is added to the reaction mixture, the supernatant liquid is removed by decantation and 100 parts of an aqueous solution of 2% sodium carbonate is added to the residue followed by stirring overnight to form crystals. The crystals formed are collected by filtration, washed with water, and dried to provide 3.5 parts of a polyamide compound (7). The product is dissolved in a small amount of NMP by heating, and the solution is diluted with methanol to purify the product by re-precipitation.

Preparation of photoactive group-containing polyamide thin film and irradiation of linearly polarized light:

In 98 parts of NMP is dissolved 2 parts of the purified product of the above-described polyamide compound (7) to prepare a solution of 2% the polymer. The polyamide thin film is formed according to the same manner as in Example 1, the film surface of the glass substrate having formed thereon the polyamide thin film is irradiated via a stripe-form mask with the linearly polarized light for one minute from a distance of 50 cm, whereby the molecular axes of the photoactive groups of the portion irradiated with the linearly polarized light are arranged to a definite direction.

Preparation of associating dichroic dye thin film:

In 8.98 parts of demonized water are dissolved 1 part of Benzopurpurine 4B and 0.02 part of Emulgen 108 (trade name, nonionic surface active agent, manufactured by Kao Corporation) by heating to prepare a dye solution. The dye solution is spin-coated on the film surface of the above-described polyamide thin film-having substrate and dried under the conditions of 40° C. and 60% RH to obtain a stripe-form polarized element of the invention. The visible absorption spectrum thereof is shown in FIG. 5. The dichroic ratio in the absorption maximum wavelength is 30.

Synthesis of 5-(4'-methoxynaphthylazo)isophthalic acid used as the raw material of the polyamide (7):

To 40 parts of water are added 12.6 parts of 5-aminoisophthalic acid diethyl ester and 18 parts of 6 N hydrochloric acid and the mixture is cooled with ice-water. In 10 parts of water is dissolved 3.67 parts of sodium nitride and the solution is added to the above-described mixture at a temperature of 5° C. or lower to perform the diazotization. Apart from this, a coupling solution of 7.7 parts of 1-naphthol, 6.5 parts of sodium carbonate, and 60 parts of water is prepared and is cooled with ice-water. To the coupling solution is added the above-described diazonium solution followed by stirring overnight at a temperature of 10° C. or lower. Then, 12 parts of 6 N hydrochloric acid is added to the mixture, and precipitates formed are collected by filtration, washed with water, and dried to obtain 20.7 parts of a monoazo dye, 5-(4'-oxy)naphthylazoisophthalic acid diethyl ester. Then, to 60 parts of DMF are added 12.5 parts of the above-described monoazo dye, 2.9 parts of sodium carbonate, and 10.0 parts of methyl toluenesulfonate and the reaction is carried out at 100° C. for 10 hours with stirring. After finishing the reaction, 120 parts of water is added to the reaction mixture and the mixture is stirred overnight to form crystals, which are collected by filtration and washed with water. Furthermore, the wet cake obtained is added to a solution formed by dissolving 3.3 parts of sodium hydroxide in 70 parts of methanol and the reaction is carried out at a temperature of from 55 to 65° C. for 4 hours with stirring. After finishing the reaction, 200 parts of water is added to the reaction mixture, after confirming that the reaction product is completely dissolved, the reaction mixture is neutralized by the addition of 6 N hydrochloric acid and the crystals precipitated are collected by filtration, washed with water, and dried to obtained 5.6 parts of 5-(4'-methoxy)naphthylazoisophthalic acid.

EXAMPLE 8

Synthesis of polyimide (8):

In a four-neck flask are placed 3.26 parts of 4-dimethylamino-4'-di(aminoethyl) aminophenylazobenzene and 60 parts of N-methyl-2-pyrrolidone and while blowing in a nitrogen gas under water cooling, the component is dissolved with stirring. Then, 2.1 parts of cyclopentane-1,2,3,4-tetracarboxylic acid anhydride is added to the solution little by little. After the addition, the reaction is carried out for 4 hours under water cooling and for 10 hours at 60° C. to obtain a solution of polyamic acid. To the solution is additionally added 40 parts of N-methyl-2-pyrrolidone to prepare a solution of 5% polyamic acid, the solution is spin-coated on a glass substrate at a dry film-thickness of from about 0.6 to 0.7 μm followed by heating to 200° C. for one hour to obtain the thin film of the polyimide. Using a super high-pressure mercury lamp (500 W/hr.), a visible light is obtained with a 550 nm cut-off filter, and further after making a linearly polarized light through a polarizing plate, the film surface of the glass substrate having formed thereon the polyimide thin film is irradiated via a stripe-form mask with the linearly polarized light for one minute from a distance of 50 cm, whereby the molecular axes of the photoactive groups of the portion irradiated with the linearly polarized light are arranged to a definite direction.

Preparation of associating dichroic dye thin film:

In 8.98 parts of deionized water are dissolved 1 part of C.I. Direct Blue 67 and 0.02 part of Emulgen 108 (trade name, nonionic surface active agent, manufactured by Kao Corporation) by heating to prepare a dye solution. The dye solution is roll-coated on the film surface of the above-described polyimide thin film-having substrate and dried under the conditions of 40° C. and 60% RH to obtain a stripe-form polarized element of the invention. The visible absorption spectrum thereof is shown in FIG. ?. The dichroic ratio in the absorption maximum wavelength is 25.

EXAMPLE 9

Synthesis of polyimide (9):

In a four-neck flask are placed 3.01 parts of N,N-diaminoethyl-4-(4'-(4"-dimethylaminophenylazo)

phenoxyundecanoyloxy)aniline and 60 parts of N-methyl-2-pyrrolidone and while blowing in a nitrogen gas under water cooling, the component is dissolved with stirring. Then, 1.55 parts of 4,4'-oxydiphthalic acid anhydride is added to the solution little by little. After the addition, the reaction is carried out for 4 hours under water cooling and for 10 hours at 60° C. to obtain a solution of polyamic acid. To the solution is additionally added 30 parts of N-methyl-2-pyrrolidone to prepare a solution of 5% polyamic acid, the solution is spin-coated on a glass substrate at a dry film-thickness of from about 0.6 to 0.7 μm, and heated to 200° C. for one hour to obtain the polyimide thin film.

EXAMPLE

According to Examples 8 and 9, the following diamine and tetracarboxylic acid anhydride are reacted, each of the polyimides shown in ka26–ka30 can be obtained.

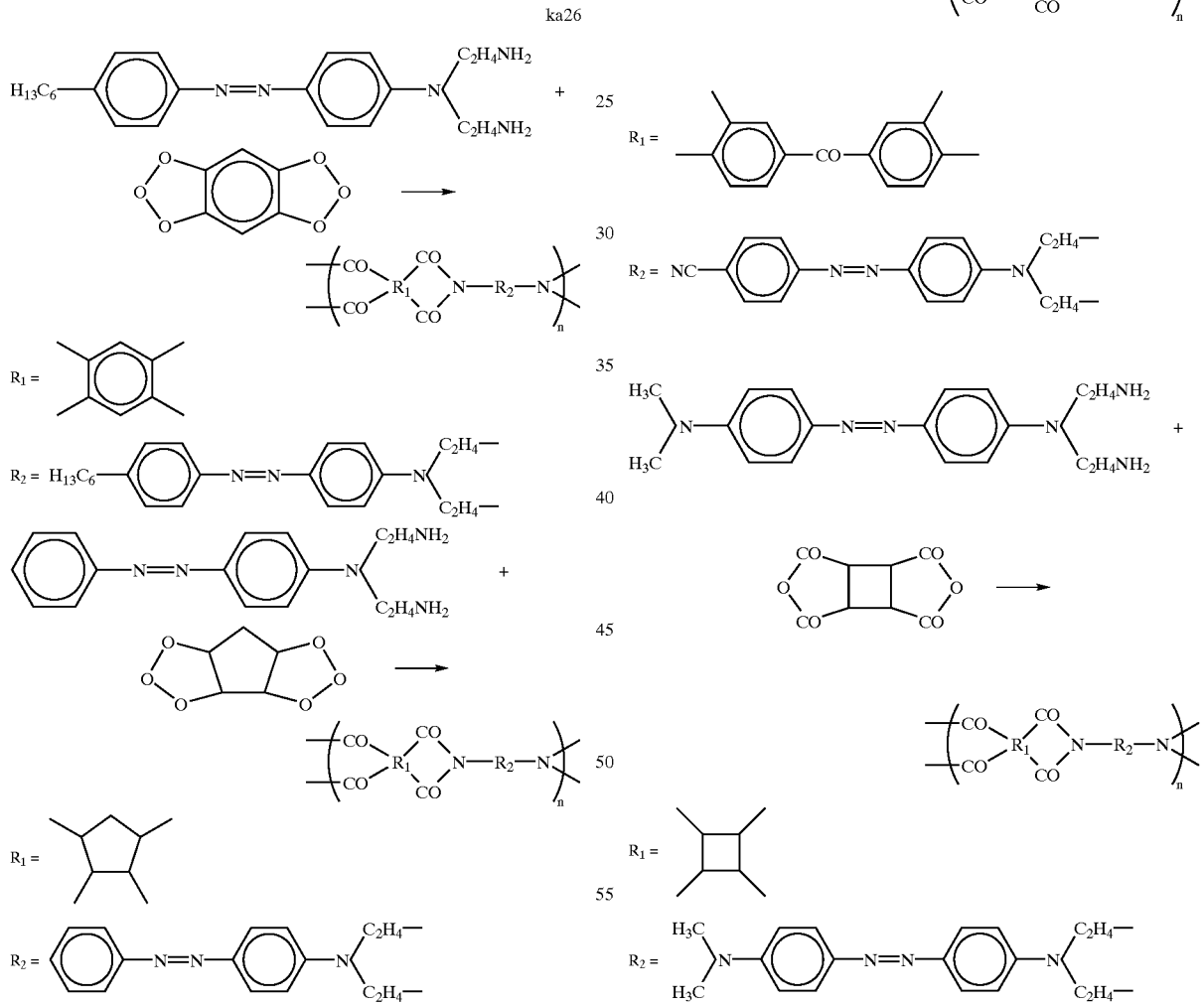

-continued
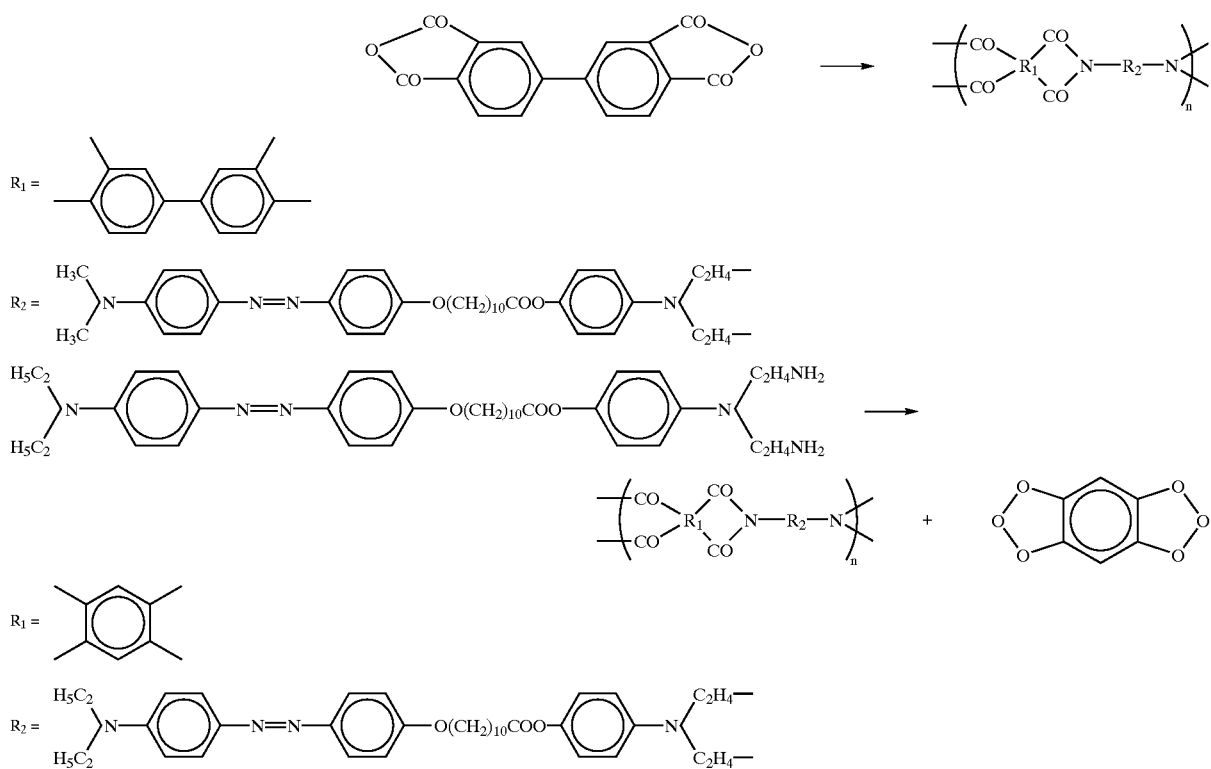
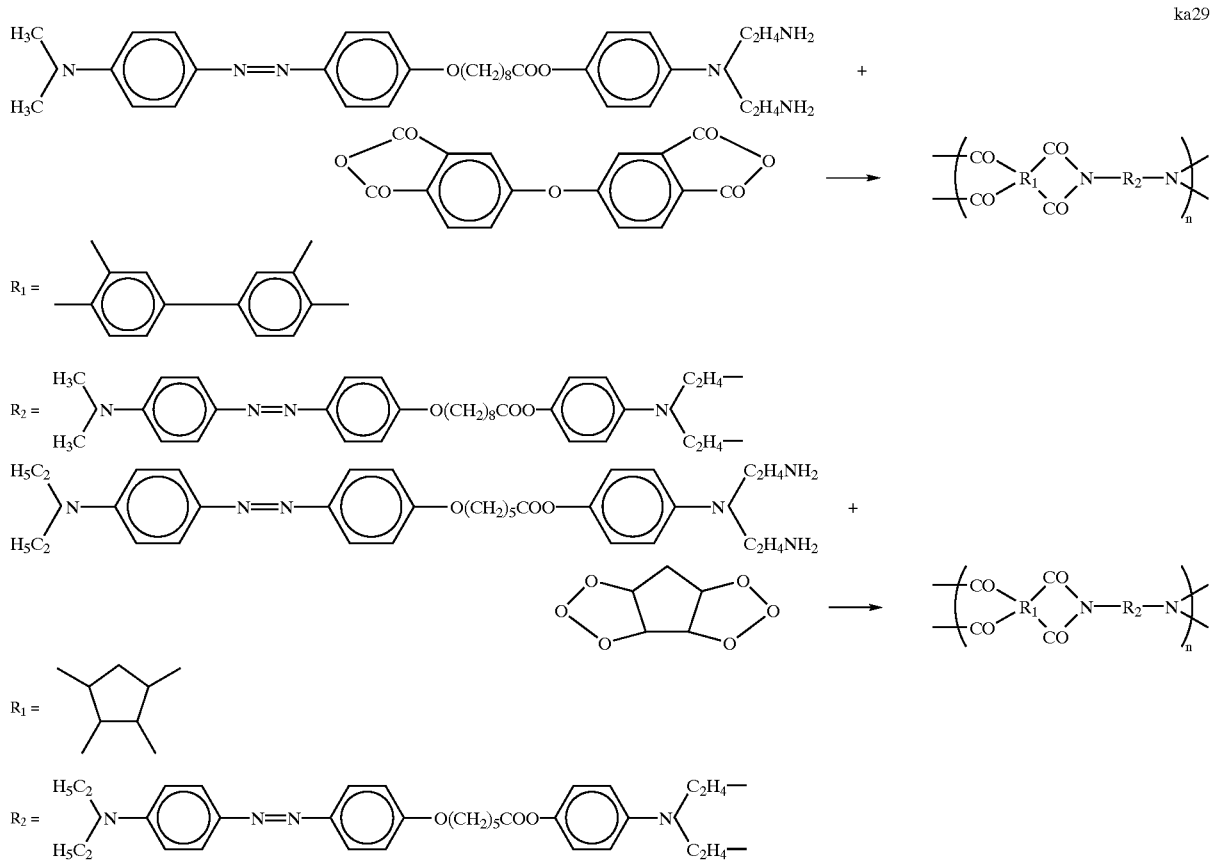

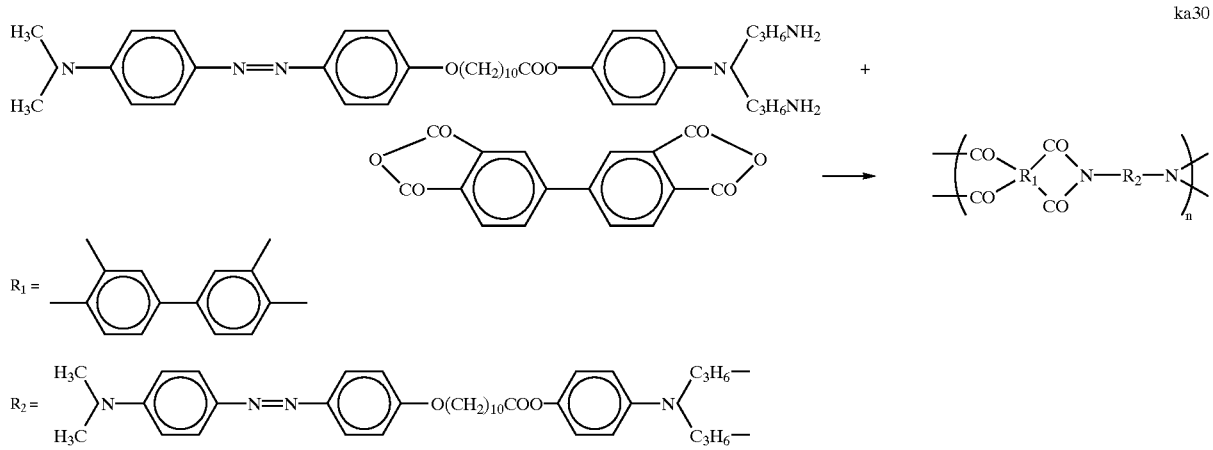

EXAMPLE 10

The film surface of the polyamide thin film formed on the glass substrate prepared in Example 1 is irradiated by the linearly polarized light obtained as in Example 1 via the stripe-form mask shown in FIG. 6 for one minute from a distance of 50 cm, whereby the molecular axes of the photoactive groups of the polarized light-irradiated portion of 1 are arranged to a definite direction. Then, the film surface of the unexposed portions of the polyamide thin film on the substrate is irradiated via the stripe-form mask shown in FIG. 7 by the linearly polarized light rotated at 90° for one minute from a distance of 50 cm, whereby the molecular axes of the photoactive groups of the polarized light-irradiated portion of 2 are arranged to the direction which is different from the direction of 1 at 90°.

Preparation of associating dichroic dye thin film:

In 26.94 parts of deionized water are dissolved 1 part of C.I. Direct Blue 1, 1 part of C.I. Direct Blue 67, 0.5 part of C.I. Direct Red 79, 0.5 part of C.I. Orange 39, and 0.06 part of Emulgen 108 (trade name, nonionic surface active agent, manufactured by Kao Corporation) by heating to prepare a dye solution. The dye solution is spin-coated on the film surface of the polyamide thin film-having substrate described above and dried under the conditions of 40° C., 60% RH to obtain the stripe-form polarized element of the invention having polarized light axes being different at 90°.

EXAMPLE 11

The film surface of the polyamide thin film formed on the glass substrate prepared in Example 4 is irradiated by the linearly polarized light obtained as in Example 4 via the stripe-form mask shown in FIG. 6 for one minute from a distance of 50 cm, whereby the molecular axes of the photoactive groups of the polarized light-irradiated portion of 1 are arranged to a definite direction. Then, the film surface of the unexposed portions of the polyamide thin film on the substrate is irradiated via the stripe-form mask shown in FIG. 7 by the linearly polarized light rotated at 90° for one minute from a distance of 50 cm, whereby the molecular axes of the photoactive groups of the polarized light-irradiated portion of 2 are arranged to the direction which is different from the direction of 1 at 90°.

Preparation of associating dichroic dye thin film:

In 26.94 parts of deionized water are dissolved 1 part of C.I. Direct Blue 83, 1 part of C.I. Direct Blue 67, 0.5 part of C.I. Direct Red 2, 0.5 part of C.I. Orange 39, and 0.06 part of Emulgen 108 (trade name, nonionic surface active agent, manufactured by Kao Corporation) by heating to prepare a dye solution. The dye solution is spin-coated on the film surface of the polyamide thin film-having substrate described above and dried under the conditions of 40° C., 60% RH to obtain the stripe-form polarized element of the invention having polarized light axes being different at 90°.

EXAMPLE 12

The film surface of a glass substrate having formed thereon the polyamide thin film prepared in Example 1 is irradiated by the linearly polarized light obtained as in Example 1 for one minute from the distance of 50 cm, whereby the molecular axes of the photoactive groups of the polarized light-irradiated portion are arranged in a definite direction.

Preparation of associating dichroic dye thin film:

In 8.98 parts of deionized water are dissolved 3 parts of C.I. Direct Blue 15 and 0.02 part of Emulgen 108 (trade name, nonionic surface active agent, manufactured by Kao Corporation) by heating to prepare a blue dye solution. Then, in 8.98 parts of deionized water are dissolved 3 parts of C.I. Direct Red 28 and 0.02 part of Emulgen 108 (trade name, nonionic surface active agent, manufactured by Kao Corporation) by heating to prepare a red dye solution. Furthermore, in 8.98 parts of deionized water are dissolved 3 parts of C.I. Direct Green 85 and 0.02 part of Emulgen 108 (trade name, nonionic surface active agent, manufactured by Kao Corporation) by heating to prepare a green dye solution. Each of the dye solutions of blue, red, and green is separately printed in a stripe form on the film surface of the polyamide thin film-formed substrate described above by a screen printing method and dried under the conditions of 40° C., 60% RH to obtain the polarized element of stripe forms of blue, red and green of the invention.

As described above, according to the present invention, by only arranging in a micropattern form a dichroic molecule on the liquid crystalline resin thin film layer having a photoactive group irradiated a linearly polarized light, a polarized element is obtained. In the invention, because a stretching operation is unnecessary, the polarized element can be directly formed on a substrate, which cannot be stretched, such as a glass substrate. Also, by only changing the polarized light axis of a linearly polarized light used for irradiation, the arrangement of the dichroic molecule can be changed. In a liquid display device using the substrate having the polarized element, stereoscopic images can be easily displayed.

What is claimed is:

1. A polarized element comprising a liquid crystalline resin thin film layer having a photoactive group on a substrate and a layer containing a dichroic molecule in contact with the liquid crystalline resin thin film layer, wherein the dichroic molecule is arranged in a micropattern form.

2. The polarized element according to claim 1 wherein the photoactive group is a group having at least one double bond selected form non-aromatic N=N, non-aromatic C=C, and non-aromatic C=N.

3. The polarized element according to claim 1 or 2 wherein the liquid crystalline resin thin film is a thin film of polyamide, polyimide, polyester or a polyurethane resin.

4. The polarized element according to claim 1 or 2 wherein the liquid crystalline resin thin film is the thin film of a polyvinyl cinnamate resin.

5. The polarized element according to claim 1 or 2 wherein the dichroic molecule is a dye having lyotropic liquid crystalline property.

6. The polarized element according to claim 5 wherein the dye having the lyotropic liquid crystalline property is a dye having a hydrophilic substituent.

7. The polarized element according to claim 6 wherein the hydrophilic substituent is a sulfonic acid group, a carboxylic acid group, an amino group, or a hydroxyl group.

8. A method of producing a polarized element, which comprises forming a liquid crystalline resin thin film having an photoactive group on a substrate and after irradiating the thin film with a linearly polarized light, arranging a dichroic molecule on the thin film in a micropattern film.

9. The method of producing a polarized element according to claim 8 wherein the irradiation of the linearly polarized light is carried out via a micropattern-form mask.

10. The method of producing a polarized element according to claim 8 wherein the irradiation of the linearly polarized light is carried out using a laser light.

11. A method of producing a polarized element which comprises forming a liquid crystalline resin thin film having an photoactive group on a substrate, irradiating the thin film with a linearly polarized light via a micropattern-form mask, and then after irradiating the thin film with a linearly polarized light having a different polarized light axis via a different micropattern-form bask, arranging a dichroic molecule on the thin film in a micropattern form.

12. A stereoscopic display device comprising a liquid crystal display device, wherein at least one of upper and lower substrates of the crystal display device facing each other is the substrate having the polarized element according to claim 1 or 2.

* * * * *

UNITED STATES PATENT AND TRADEMARK OFFICE
CERTIFICATE OF CORRECTION

PATENT NO. : 6,541,185 B1
DATED : April 1, 2003
INVENTOR(S) : Daisaku Matsunaga et al.

It is certified that error appears in the above-identified patent and that said Letters Patent is hereby corrected as shown below:

<u>Title page,</u>
Item [30], please add the following:
-- FOREIGN/PCT Applications
JAPAN 11-266967 09/21/99 --

Signed and Sealed this

Twenty-third Day of December, 2003

JAMES E. ROGAN
*Director of the United States Patent and Trademark Office*